(12) United States Patent
Olah et al.

(10) Patent No.: US 12,344,707 B2
(45) Date of Patent: Jul. 1, 2025

(54) FUNCTIONAL POLYESTER AND METHOD OF PRODUCING THE SAME

(71) Applicant: PPG Industries Ohio, Inc., Cleveland, OH (US)

(72) Inventors: Michael G. Olah, Pittsburgh, PA (US); Edward R. Millero, Jr., Gibsonia, PA (US); Scott J. Moravek, Mars, PA (US); Matthew William Skinner, Pittsburgh, PA (US); Theodore Frank Novitsky, Butler, PA (US); William H. Retsch, Jr., Allison Park, PA (US); Daniel Martin Connor, Evans City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 300 days.

(21) Appl. No.: 17/287,621

(22) PCT Filed: Oct. 17, 2019

(86) PCT No.: PCT/IB2019/058855
§ 371 (c)(1),
(2) Date: Apr. 22, 2021

(87) PCT Pub. No.: WO2020/084409
PCT Pub. Date: Apr. 30, 2020

(65) Prior Publication Data
US 2022/0002483 A1    Jan. 6, 2022

Related U.S. Application Data

(60) Provisional application No. 62/749,261, filed on Oct. 23, 2018.

(51) Int. Cl.
| | |
|---|---|
| *C08G 63/91* | (2006.01) |
| *B65D 65/42* | (2006.01) |
| *C08F 283/01* | (2006.01) |
| *C09D 5/03* | (2006.01) |
| *C09D 151/08* | (2006.01) |
| *C09D 167/06* | (2006.01) |

(52) U.S. Cl.
CPC ........... *C08G 63/918* (2013.01); *B65D 65/42* (2013.01); *C08F 283/01* (2013.01); *C09D 5/03* (2013.01); *C09D 151/08* (2013.01); *C09D 167/06* (2013.01); *C08G 2150/20* (2013.01)

(58) Field of Classification Search
CPC .............................. C08F 290/061; C08L 67/06
See application file for complete search history.

(56) References Cited

U.S. PATENT DOCUMENTS

| | | | | |
|---|---|---|---|---|
| 2,255,313 | A * | 9/1941 | Ellis ........................ | C08L 67/06 525/518 |
| 5,639,560 | A | 6/1997 | Moens et al. | |
| 2008/0139736 | A1 | 6/2008 | Yamada et al. | |
| 2009/0203281 | A1* | 8/2009 | He ....................... | D01D 5/0985 525/384 |
| 2014/0076768 | A1* | 3/2014 | Skillman .............. | B32B 15/095 524/559 |

FOREIGN PATENT DOCUMENTS

| | | |
|---|---|---|
| CN | 103242628 A | 8/2013 |
| CN | 104231562 A | 12/2014 |
| JP | 109239316 A | 9/1997 |
| JP | H09302054 A | 11/1997 |
| JP | 2000159845 A | 6/2000 |

OTHER PUBLICATIONS

English machine translation for JP2000-159845. (Year: 2000).*
Cooper, "A Biobased Multifaceted Polymeric Material: A Case for Poly(butylene succinate)", Master's Thesis, University of Guelph, Sep. 2018. (Year: 2018).*
Chen Wan, Reactive Modification of Polyesters and Their Blends, PhD dissertation, New Jersey's Science & Technology University, Jan. 2004 A Chemical view onto post consumer poly ethylene terephthalate valorization through reactive blending with functionalised polyolefins. Polymer science series A51, No. 11-12, Nov.-Dec. 2009, p. 10249-1261.
PCT/IB2019/058855—International Search Report and Written Opinion, Dated Jan. 21, 2020.

* cited by examiner

*Primary Examiner* — Christopher M Rodd
(74) *Attorney, Agent, or Firm* — Diane R. Meyers

(57) ABSTRACT

There is described a method for the production of a functional polyester having functional group X. The method comprises the step of melt blending a composition comprising (i) a high number average molecular weight (Mn) polyester having a Mn of ≥6,000 Da; and (ii) a functional compound comprising functional group Y which may be the same as functional group X or be different to functional group X but be operable to form functional group X in the functional polyester. The composition is melt blended such that the high Mn polyester and the functional compound react to produce the functional polyester. The high Mn polyester has a Mn that is higher than the Mn of the functional compound. The present invention extends to functional polyesters produced by the method; aqueous, solventborne and powder coating compositions containing the functional polyester, and articles coated with the said coating compositions.

24 Claims, No Drawings

FUNCTIONAL POLYESTER AND METHOD OF PRODUCING THE SAME

FIELD OF THE INVENTION

The present invention relates to functional polyesters for use in coating compositions and methods of producing the same. The present invention extends to aqueous, solvent-borne and powder coating compositions containing the functional polyesters; and articles coated with the coating compositions.

BACKGROUND OF THE INVENTION

Coatings are used in a wide variety of different applications. For example, many different coatings have been used to coat food and/or beverage containers. Coating systems typically have certain properties such as being capable of high speed application, having acceptable adhesion to the substrate, being safe for food contact and having properties that are suitable for their end use. Typically, coatings have one, or maybe two, of these advantageous properties depending on their final end use.

The properties of the polymer, such as a polyester, that forms the binder of the coating composition are important for achieving the desired properties of a coating composition. For example, it is desirable that the polymers are able to be adequately dispersed into a desired carrier. It can also be desirable for the polymers to have functionality. In addition to such features, it is also desirable that the polymer maintain the necessary mechanical properties.

It is common to produce suitable polyester binders from monomer starting materials, for example in a batch process.

SUMMARY OF THE INVENTION

According to the present invention there is provided a method for the production of a functional polyester having functional group X, comprising:
  melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester,
  wherein the composition is melt blended such that the high Mn polyester and the functional compound react to produce the functional polyester,
  and wherein the high Mn polyester has a Mn that is higher than the Mn of the functional compound.

There is also provided a functional polyester having functional group X obtainable by:
  melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester,
  wherein the composition is melt blended such that the high Mn polyester and the functional compound react to produce the functional polyester,
  and wherein the high Mn polyester has a Mn that is higher than the Mn of the functional compound.

There is also provided a method of preparing an acrylic polyester comprising:
  grafting an acrylic polymer onto a functional polyester having functional group X to form the acrylic polyester, wherein the functional polyester is obtainable by melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester,
  wherein the composition is melt blended such that the high Mn polyester and the functional compound react to produce the functional polyester,
  and wherein the high Mn polyester has a Mn that is higher than the Mn of the functional compound.

There is also provided an acrylic polyester obtainable by:
  a. producing a functional polyester having a functional group X by melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester
  wherein the composition is melt blended such that the high Mn polyester and the functional compound react to produce the functional polyester,
  and wherein the high Mn polyester has a Mn that is higher than the Mn of the functional compound,
  b. grafting an acrylic polymer onto the functional polyester produced in step (a).

There is also provided a method of producing an aqueous dispersion comprising a functional polyester having functional group X and/or an acrylic polyester comprising:
  dispersing a functional polyester having functional group X or an acrylic polyester in water,
  wherein the acrylic polyester is obtainable by grafting an acrylic polymer onto a functional polyester having functional group X,
  and wherein the functional polyester having functional group X of the dispersion or of the acrylic polyester is obtainable by melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester,
  wherein the composition is melt blended such that the high Mn polyester and the functional compound react to produce the functional polyester,
  and wherein the high Mn polyester has a Mn that is higher than the Mn of the functional compound.

There is also provided an aqueous dispersion comprising a functional polyester having functional group X and/or an acrylic polyester, wherein the functional polyester having functional group X and the acrylic polyester are obtainable by:
  a. producing a functional polyester having a functional group X by melt blending a composition comprising
    i. a high number average molecular weight (Mn) polyester having a Mn of ≥6,000 Da; and
    ii. a functional compound comprising functional group Y which may be the same as functional group X or be different to functional group X but be operable to form functional group X in the functional polyester wherein the composition is melt blended such that the high Mn polyester and the functional compound react to produce the functional polyester, and wherein the high Mn polyester has a Mn that is higher than the Mn of the functional compound, b. optionally grafting an acrylic polymer onto the functional polyester produced in step (a) to form the acrylic polyester.

There is also provided a method of producing a solvent solution comprising a functional polyester having functional group X and/or an acrylic polyester comprising:

contacting a functional polyester having functional group X and/or an acrylic polyester with a solvent, wherein the acrylic polyester is obtainable by grafting an acrylic polymer onto a functional polyester having functional group X, wherein the functional polyester having functional group X of the solution or of the acrylic polyester is obtainable by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester, wherein the composition is melt blended such that the high Mn polyester and the functional compound react to produce the functional polyester, and wherein the high Mn polyester has a Mn that is higher than the Mn of the functional compound.

There is also provided a solvent solution comprising a functional polyester having functional group X and/or an acrylic polyester, wherein the functional polyester having functional group X and the acrylic polyester are obtainable by:

a. producing a functional polyester having a functional group X by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester wherein the composition is melt blended such that the high Mn polyester and the functional compound react to produce the functional polyester, and wherein the high Mn polyester has a Mn that is higher than the Mn of the functional compound, b. optionally, grafting an acrylic polymer onto the functional polyester produced in step (a) to form the acrylic polyester.

There is also provided a method of producing a powder composition comprising a functional polyester having functional group X and/or an acrylic polyester comprising:

removing any solvent from a functional polyester having functional group X and/or an acrylic polyester, wherein the acrylic polyester is obtainable by grafting an acrylic polymer onto a functional polyester having functional group X, wherein the functional polyester having functional group X of the powder composition or of the acrylic polyester is obtainable by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester, wherein the composition is melt blended such that the high Mn polyester and the functional compound react to produce the functional polyester, and wherein the high Mn polyester has a Mn that is higher than the Mn of the functional compound.

There is also provided a powder composition comprising a functional polyester having functional group X or an acrylic polyester, wherein the functional polyester having functional group X and the acrylic polyester are obtainable by:

a. producing a functional polyester having a functional group X by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester wherein the composition is melt blended such that the high Mn polyester and the functional compound react to produce the functional polyester, and wherein the high Mn polyester has a Mn that is higher than the Mn of the functional compound, b. optionally grafting an acrylic polymer onto the functional polyester produced in step (a) to form the acrylic polyester.

There is also provided a method of producing a coating composition comprising:

introducing a crosslinking material to a dispersion, solution or powder composition, wherein the dispersion, solution or powder composition comprises a functional polyester having functional group X and/or an acrylic polyester wherein the acrylic polyester of the dispersion, solution or powder is obtainable by grafting an acrylic polymer onto a functional polyester having functional group X, and wherein the functional polyester of the dispersion, solution, powder composition or of the acrylic polyester is obtainable by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester, wherein the composition is melt blended such that the high Mn polyester and the functional compound react to produce the functional polyester, and wherein the high Mn polyester has a Mn that is higher than the Mn of the functional compound.

There is also provided an aqueous, solventborne or powder coating composition comprising crosslinking material with a functional polyester having functional group X and/or an acrylic polyester, wherein the functional polyester having functional group X and the acrylic polyester are obtainable by:

a. producing a functional polyester having a functional group X by melt blending a composition comprising i. a high number average molecular weight (Mn) polyester having a Mn of ≥6,000 Da; and ii. a functional compound comprising functional group Y which may be the same as functional group X or be different to functional group X but be operable to form functional group X in the functional polyester wherein the composition is melt blended such that the high Mn polyester and the functional compound react to produce the functional polyester,
and wherein the high Mn polyester has a Mn that is higher than the Mn of the functional compound,
b. optionally grafting an acrylic polymer onto the functional polyester produced in step (a) to form the acrylic polyester.

There is also provided a method of coating at least a portion of a substrate, the method comprising:
a. contacting a aqueous, solventborne or powder coating composition with the substrate;
b. curing the coating composition on the substrate to form a coating;
wherein coating composition comprises a crosslinking material with a functional polyester having functional group X and/or an acrylic polyester, wherein the acrylic polyester is obtainable by grafting an acrylic polymer onto a functional polyester having functional group X,
wherein the functional polyester having functional group X of the coating composition or of the acrylic polyester is obtainable by melt blending a composition comprising
  i. a high number average molecular weight (Mn) polyester having a Mn of ≥6,000 Da; and
  ii. a functional compound comprising functional group Y which may be the same as functional group X or be different to functional group X but be operable to form functional group X in the functional polyester,
wherein the composition is melt blended such that the high Mn polyester and the functional compound react to produce the functional polyester,
and wherein the high Mn polyester has a Mn that is higher than the Mn of the functional compound.

There is also provided a substrate at least partially coated with a coating composition comprising crosslinking material with a functional polyester having functional group X and/or an acrylic polyester, wherein the functional polyester having functional group X and the acrylic polyester are obtainable by:
a. producing a functional polyester having a functional group X by melt blending a composition comprising
  i. a high number average molecular weight (Mn) polyester having a Mn of ≥6,000 Da; and
  ii. a functional compound comprising functional group Y which may be the same as functional group X or be different to functional group X but be operable to form functional group X in the functional polyester
wherein the composition is melt blended such that the high Mn polyester and the functional compound react to produce the functional polyester,
and wherein the high Mn polyester has a Mn that is higher than the Mn of the functional compound,
b. optionally, grafting an acrylic polymer onto the functional polyester produced in step (a) to form an acrylic polyester.

DETAILED DESCRIPTION OF THE INVENTION

The high Mn polyester may be an organic solvent insoluble polyester. The high Mn polyester may have a solubility of less than 0.1 g in 10 mL of the chosen solvent or solvent mixture, such as tetrahydrofuran, at standard ambient temperature and pressure (25° C. and 1 atm). The high Mn polyester may be a virgin polyester, i.e. newly manufactured plastic, normally in the form of pellets, that has not yet been made into a product, or a recycled polyester, i.e. plastic that has already been made into a product, for example a beverage bottle.

The high Mn polyester has a Mn of ≥6,000 Da and a Mn that is higher than the Mn of the functional compound. When used herein, the term "high" in relation to the high Mn polyester means only that the Mn of the high Mn polyester is ≥6,000 Da and is higher than the Mn of the functional compound and the use of the term "high" in this context implies no other limitation to the said polyester of component (i) of the composition.

The high Mn polyester may have a Mn of ≥8,000 Da, such as ≥10,000, or ≥12,000 Da, or ≥15,000 Da.

The high Mn polyester may have a Mn of ≥500,000 Da, such as ≥200,000, or ≥100,000 Da.

As reported herein, the Mn and Mw were determined by gel permeation chromatography performed using a Waters 2695 separation module with a Waters 2414 differential refractometer (RI detector). Tetrahydrofuran (THF) was used as the eluent at a flow rate of 1 ml min-1, and two PLgel Mixed-C (300×7.5 mm) columns were used for separation at room temperature. The polymeric samples were measured relative to linear polystyrene standards of 800 to 900,000 Da.

The high Mn polyester may comprise a number of functional groups X per chain of ≥1, such as of ≥0.5. The high Mn polyester may comprise an ethylenic unsaturation per chain of ≥1, such as of ≥0.5.

As reported herein, the unsaturation per chain was determined from the GPC measured number average molecular weight and unsaturation equivalent weight. The unsaturation equivalent weight was determined by back-titration with 0.1 N aqueous sodium thiosulfate solution. A sample of solid resin (0.1 g) was weighed accurately into a conical flask and dissolved, using light heating and stirring as appropriate, in 40 mL of tetrahydrofuran along with 40 mL of Wijs solution (0.2N iodine monochloride in acetic acid). The mixture was stored in the dark for one hour at a temperature of 25° C.±5° C. 20 mL of a 30% wt/v aqueous potassium iodide solution was added to the mixture followed by 50 mL of a 50/50 v:v tetrahydrofuran/deionized water solution and 20 mL of 20/30 v:v propylene glycol/tetrahydrofuran. The solution was then titrated potentiometrically with a 0.1 N aqueous sodium thiosulfate solution using a platinum electrode. A solvent blank was prepared by accurately weighing 40 mL of tetrahydrofuran and following the same procedure for back-titration using Wijs solution and 0.1 N aqueous sodium thiosulfate reported herein. The resulting ethylenic unsaturation equivalent weight is reported as grams per equivalent and is calculated using the following equation:

Ethylenic unsaturation equivalent weight=(sample weight (g)×2000)/((sample titration volume (mL)−solvent blank titration volume (mL))× normality of sodium thiosulfate solution (equivalent/L))

Ethylenic unsaturation per chain is calculated using the following equation:

Ethylenic unsaturation per chain=Number average molecular weight (Da)/ethylenic unsaturation equivalent weight (g/equivalent)

The high Mn polyester may have a gross hydroxyl value (OHV) of ≥15 mg KOH/g, such as ≥10 mg KOH/g, or ≥5 mg KOH/g.

The gross OHV is suitably expressed on solids.

As reported herein, the hydroxyl value is the number of mg of KOH equivalent to the hydroxyl groups in 1 g of material. A sample of solid polyester (0.13 g) was weighed accurately into a conical flask and dissolved, using light heating and stirring as appropriate, in 20 mL of tetrahydrofuran. 10 mL of 0.1 M 4-(dimethylamino)pyridine in tetrahydrofuran (catalyst solution) and 5 mL of a 9 vol % solution of acetic anhydride in tetrahydrofuran (i.e. 90 mL acetic anhydride in 910 mL tetrahydrofuran; acetylating solution) were then added to the mixture. After 5 minutes, 10 mL of an 80 vol % solution of tetrahydrofuran (i.e. 4 volume parts tetrahydrofuran to 1 part distilled water; hydrolysis solution) was added. After 15 minutes, 10 mL tetrahydrofuran was added and the solution was titrated with 0.5M ethanolic potassium hydroxide (KOH). A blank sample was also run where the sample of solid polyester was omitted. The resulting hydroxyl value is expressed in units of mg KOH/g and is calculated using the following equation:

$$\text{Hydroxyl value} = \frac{(V_2 - V_1) \times \text{molarity of KOH solution(M)} \times 56.1}{\text{weight of solid sample(g)}}$$

wherein $V_1$ is the titre of KOH solution (ml) of the polyester sample and $V_2$ is the titre of KOH solution (ml) of the blank sample.

All values for gross hydroxyl value reported herein were measured in this way.

The high Mn polyester may have an acid value (AV) of ≥15 mg KOH/g, such as ≥10 mg KOH/g, ≥5 mg KOH/g, or ≥2 mg KOH/g.

The AV is suitably expressed on solids.

As reported herein, the AV was determined by titration with 0.1 M methanolic potassium hydroxide (KOH) solution. A sample of solid polyester (0.1 g) was weighed accurately into a conical flask and dissolved, using light heating and stirring as appropriate, in 25 mL of dimethyl formamide containing phenolphthalein indicator. The solution was then cooled to room temperature and titrated with the 0.1 M methanolic potassium hydroxide solution. The resulting acid number is expressed in units of mg KOH/g and is calculated using the following equation:

$$\text{Acid number} = \frac{\text{titre of KOH solution(ml)} \times \text{molarity KOH solution(M)} \times 56.1}{\text{weight of solid sample(g)}}$$

All values for acid number reported herein were measured in this way.

The high Mn polyester may have a thiol equivalent weight of ≥1,000 g/equivalent, such as ≥10.000 g/equivalent, or ≥100,000 g/equivalent.

As reported herein, the thiol equivalent weight was determined by titration with a 0.1 N silver nitrate solution. A sample of solid resin (0.1 g) was weighed accurately into a conical flask and dissolved, using light heating and stirring as appropriate, in 30 mL of pyridine and 50 mL of THF. The solution was then cooled to room temperature and titrated potentiometrically with the 0.1 N silver nitrate in isopropanol solution. The resulting thiol equivalent weight is reported as grams per equivalent and is calculated using the following equation:

Thiol equivalent weight=(specimen weight (g)× 1000)/(titration volume (mL)×normality of the silver nitrate solution (equivalent/L))

The high Mn polyester may have an amine equivalent weight of ≥1,000 g/equivalent, such as ≥10.000 g/equivalent, or ≥100,000 g/equivalent.

As reported herein, the amine equivalent weight was determined by titration with a 0.1 N perchloric acid solution. A sample of solid resin (0.1 g) was weighed accurately into a conical flask and dissolved, using light heating and stirring as appropriate, in 70 mL of acetic acid. The solution was then cooled to room temperature and titrated potentiometrically with the 0.1 N perchloric acid in acetic acid. A solvent blank was prepared by accurately weighing the same volume of acetic acid used for the sample titration (70 mL) into a separate conical flask. The solvent blank solution was then titrated potentiometrically with the 0.1 N perchloric acid in acetic acid. The resulting amine equivalent weight is reported as grams per equivalent and is calculated using the following equation:

Amine equivalent weight=(specimen weight (g)× 1000)/((sample titration volume (mL)−solvent blank titration volume (mL))×normality of the perchloric acid solution (equivalent/L))

The high Mn polyester may have a Tg of from −70° C. to 200° C., such as from 0° C. to 150° C., or from 50° C. to 120° C.

As reported herein, the Tg was measured according to ASTM D6604-00 (2013) ("Standard Practice for Glass Transition Temperatures of Hydrocarbon Resins by Differential Scanning Calorimetry". Heat-flux differential scanning calorimetry (DSC), sample pans: aluminium, reference: blank, calibration: indium and mercury, sample weight: 10 mg, heating rate: 20° C./min).

The high Mn polyester may be obtainable by polymerising a polyacid component with a polyol component or by ring opening polymerization, such as ring opening polymerization of a lactone component and/or an epoxy component.

The polyacid component comprises a polyacid. "Polyacid" and like terms as used herein, refers to a compound having two or more carboxylic acid groups, such as two (diacids), three (triacids) or four acid groups, and includes an ester of the polyacid (wherein an acid group is esterified) or an anhydride. The polyacid may be an organic polyacid.

The carboxylic acid groups of the polyacid may be connected by a bridging group selected from: an alkylene group; an alkenylene group; an alkynylene group; or an arylene group.

The high Mn polyester may be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; a monomer having an aliphatic group containing at least 15 carbon atoms; esters and anhydrides of all the aforementioned acids and combinations thereof.

The polyacid component may comprise a diacid. Suitable examples of diacids include, but are not limited to the following: phthalic acid; isophthalic acid; terephthalic acid;

1,4 cyclohexane dicarboxylic acid; succinic acid; adipic acid; azelaic acid; sebacic acid; fumaric acid; 2,6-naphthalene dicarboxylic acid; orthophthalic acid; phthalic anhydride; tetrahydrophthalic acid; hexahydrophthalic acid; maleic acid; succinic acid; itaconic acid; di-ester materials, such as dimethyl ester derivatives for example dimethyl isophthalate, dimethyl terephthalate, dimethyl 1,4-cyclohexane dicarboxylate, dimethyl 2,6-naphthalene di carboxylate, dimethyl fumarate, dimethyl orthophthalate, dimethylsuccinate, dimethyl glutarate, dimethyl adipate; a monomer having an aliphatic group containing at least 15 carbon atoms; esters and anhydrides of all the aforementioned acids; and mixtures thereof.

The polyacid component may comprise: terephthalic acid (TPA), dimethyl terephthalate, isophthalic acid (IPA), dimethyl isophthalate, 1,4 cyclohexane dicarboxylic acid, hexahydrophthalic anhydride, 2,6-naphthalene dicarboxylic acid, phthalic anhydride, maleic anhydride, fumaric anhydride; and/or a monomer having an aliphatic group containing at least 15 carbon atoms.

The polyacid component may comprise: isophthalic acid, dimethyl terephthalate, hexahydrophthalic anhydride, cyclohexane 1,4-dicarboxylic acid and/or a monomer having an aliphatic group containing at least 15 carbon atoms.

The polyol component comprises a polyol. "Polyol" and like terms, as used herein, refers to a compound having two or more hydroxyl groups, such as two (diols), three (triols) or four hydroxyl groups (tetrols). The hydroxyl groups of the polyol may be connected by a bridging group selected from: an alkylene group; an alkenylene group; an alkynylene group; or an arylene group. The polyol may be an organic polyol.

The high Mn polyester may be formed from any suitable polyol. Suitable examples of polyols include, but are not limited to the following: akylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; 2,2,4,4-tetraalkylcyclobutane-1,3-diol (TACD), such as 2,2,4,4-tetramethylcyclobutane-1,3-diol (TMCD), 2,2,4-trimethyl-1,3-pentanediol (TMPD), caprolactonediol (for example, the reaction product of epsilon-capro lactone and ethylene glycol); hydroxyalkylated bisphenols; polyether glycols, for example, poly(oxytetramethylene)glycol; trimethylol propane; pentaerythritol; di-pentaerythritol; trimethylol ethane; trimethylol butane; dimethylol cyclohexane; bio-derived polyols such as glycerol, sorbitol and isosorbide; a monomer having an aliphatic group containing at least 15 carbon atoms; and the like or combinations thereof.

The diols may be selected from: ethylene glycol; 1,2-propane diol; 1,3-propane diol; 1,2-butane diol; 1,3-butane diol; 1,4-butane diol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; 2,2,4,4-tetraalkylcyclobutane-1,3-diol (TACD), such as 2,2,4,4-tetramethylcyclobutane-1,3-diol (TMCD), 2,2,4-trimethyl-1,3-pentanediol (TMPD), diethylene glycol; triethylene glycol; dipropylene glycol; tripropylene glycol; 1,4 cyclohexane dimethanol; tricyclodecane dimethanol; isosorbide; 1,4-cyclohexane diol; and/or 1,1'-isopropylidene-bis(4-cyclohexanol); and mixtures thereof.

The polyol component may comprise a polyol having at least three hydroxyl groups, such as trimethylol propane; pentaerythritol; di-pentaerythritol; trimethylol ethane; trimethylol butane; and/or bio-derived polyols such as glycerol and/or sorbitol. The polyol component having at least three hydroxyl groups may comprise a triol or tetrol, such as trimethylol propane; pentaerythritol; trimethylol ethane; trimethylol butane and/or glycerol. The polyol component having at least three hydroxyl groups may comprise a triol, such as trimethylol propane; trimethylol ethane; and/or trimethylol butane, for example trimethylol propane.

The polyol having at least three hydroxyl groups may be present as a proportion of the dry weight of the polyol component in an amount of from 0.1 to 10 wt %, such as from 0.5 to 8 wt % or from 0.7 to 6 wt %, for example from 0.8 to 5 wt % or from 0.9 to 4 wt %, such as from 1 to 3 wt % or from 1 to 2 wt %.

In particular the polyol component may comprise ethylene glycol (EG), 1,2-propylene glycol (PG), 2-methyl propanediol (2-MPD), neopentyl glycol (NPG), 1,4-cyclohexane dimethanol (CHDM), butyl ethyl propane diol (BEPD), trimethylolpropane (TMP) and/or 1,6 hexanediol.

Further details of such a monomer having an aliphatic group containing at least 15 carbon atoms are disclosed in published PCT patent application WO 2018/111854, specifically, paragraphs [016] to [030] inclusive. The entire contents of WO 2018/111854 and specifically paragraphs [016] to [030]inclusive thereof are fully incorporated herein by reference.

The polyacid component and/or the polyol component may comprise a sulfonated monomer. The sulfonated monomer may comprise a sulfonated diacid, such as a sulfonated aromatic diacid. The sulfonated monomer may comprise a salt thereof, such as an inorganic salt, for example a metal or ammonium salt. Examples of metal salts would include, for example sodium salts, lithium salts, potassium salts, magnesium salts, calcium salts, iron salts etc.

The polyacid component may comprise a sulfonated monomer. Alternatively, the polyacid component may be substantially free of sulfonated monomer.

The sulfonated monomer may comprise a metal salt of 5-(sulfo)-isopthalic acid, such as the sodium salt thereof, referred to as 5-(sodiosulfo)-isophthalic acid, also referred to herein as 5-SSIPA.

The sulfonated monomer may comprise: 5-(sodiosulfo)-isophthalic acid, dimethyl 5-(sodiosulfo)isophalate, 5-(lithiosulfo)isophthalic acid, and/or bis(2-hydroxyethyl)-5-(sodiosulfo)isophthalate.

Where the sulfonated monomer is a polyacid, the sulfonated monomer may be present as a proportion of the dry weight of the polyacid component in an amount of from 5 to 20 wt %, such as 7 to 15 wt %.

Where the sulfonated monomer is a polyol, the sulfonated monomer may be present as a proportion of the dry weight of the polyol component in an amount of from 5 to 20 wt %, such as 7 to 15 wt %. [61] The high Mn polyester according to the present invention may be prepared in the presence of an esterification catalyst. The esterification catalyst may be chosen to promote the reaction of components by esterification and/or trans-esterification. Suitable examples of esterification catalysts for use in the preparation of the high Mn polyester include, but are not limited to the following: metal compounds such as stannous octoate; stannous chloride; butyl stannoic acid (hydroxy butyl tin oxide); monobutyl tin tris(2-ethylhexanoate); chloro butyl tin dihydroxide; dibutyl tin oxide; tetra-n-propyl titanate; tetra-n-butyl titanate; zinc acetate; acid compounds such as phosphoric acid; para-toluene sulphonic acid; dodecyl benzene sulphonic acid (DDBSA), tetra alkyl zirconium materials, antimony trioxide, germanium dioxide, bismuth octoate and combinations thereof. The esterification catalyst may be dodecyl benzene sulphonic acid (DDBSA). The esterification catalyst may be dibutyl tin oxide or stannous octoate.

The high Mn polyester may be Tritan TX1000, which is available from Eastman, Vylon GK 880, which is available from Tyobo, or recycled polyethylene terephthalate (PET).

The esterification catalyst, when present, may be used in amounts from 0.001 to 1% by weight of the total polymer components, such as from 0.01 to 0.2%, such as from 0.025 to 0.2% by weight of the total polymer components.

The composition may comprise ≥40% of the high Mn polyester by total dry weight of the composition, such as ≥45 wt %, or ≥50 wt %.

The composition may comprise ≤99.9% of the high Mn polyester by total dry weight of the composition, such as ≤99.5%, or ≤99%, or ≤98%, or ≤97 wt %, or ≤96 wt %.

Functional group Y of the functional compound may be operable to react with an acrylic polymer such as to graft the acrylic polymer onto the functional polyester provided by the method of the present invention via functional group Y. Functional group Y of the functional compound may be ethylenic unsaturation, an ether group, an amide group, an amine group, a ketone group, an epoxy group, a hydroxyl group and/or an acid group, such as ethylenic unsaturation, a hydroxyl group and/or a carboxylic acid group, such as ethylenic unsaturation.

Functional group Y of the functional compound may be the same as functional group X of the functional polyester produced by the above-mentioned method. Functional group X may be different from functional group Y and functional group X may be generated during the melt blending reaction from functional group Y, for example by generation of a hydroxyl functional group X from an epoxy functional group Y.

The functional compound comprises functional group Y. When used herein, the term "functional" in relation to the functional compound means only that the functional compound comprises at least functional group Y and the use of the term "functional" in this context implies no other limitation to the said compound of component (ii) of the composition.

The functional compound may be a polymer. The functional compound may be a polyester, polyamide, polyether, polyimide, polyacrylic, polyvinyl, polyurethane, polysiloxane, or polyurea.

The functional compound may be a polyester obtainable by polymerising a polyacid component with a polyol component, wherein the polyacid and polyol components are as defined for the high Mn polyester. The functional compound may be a polyester obtainable via the ring-opening polymerisation of a lactone component and/or an epoxy component.

The functional compound may be prepared in the presence of an esterification catalyst, wherein the esterification catalyst is as defined for the high Mn polyester.

The polyol and/or the polyacid component of the functional compound may comprise a functional monomer, operable to impart functional group Y in the functional compound, such as to provide a functional group Y that is the same as functional group X in the functional polyester.

The functionality may be such that an acrylic polymer may be grafted onto the functional polyester produced by the above-mentioned method via the use of said functionality. The functionality may be in the backbone of the functional compound or pendant therefrom.

The functional monomer may comprise an ethylenically unsaturated monomer, which ethylenically unsaturated monomer may be operable to impart ethylenically unsaturated functionality on the backbone of the functional compound, or pendant therefrom. The functionality may comprise ethylenic unsaturation, which may be in the backbone of the functional compound.

The functional monomers may be: maleic acid, maleic anhydride, fumaric acid, itaconic anhydride, itaconic acid, citraconic anhydride, citraconic acid, aconitic acid, aconitic anhydride, oxalocitraconic acid, oxalocitraconic anhydride, mesaconic acid, mesaconic anhydride, phenyl maleic acid, phenyl maleic anhydride, t-butyl maleic acid, t-butyl maleic anhydride, monomethyl fumarate, monobutyl fumarate, nadic acid, nadic anhydride, methyl maleic acid, methyl maleic anhydride, ricinoleic acid, lesquerolic acid, undecylenic acid, allyl alcohol, 3-buten-1-ol, crotyl alcohol, 4-pentene-1-ol, alpha-angelica lactone, alpha-methytene-γ-butyrolactone, 5,6-dihydro-2H-pyran-2-one, allyl glycidyl ether, and/or trimethylolpropane monoallyl ether.

Where the functional monomer is a polyacid, the functional monomer may be present as a proportion of the dry weight of the polyacid component in an amount of from 5 to 100 wt %, such as from 10 to 50 wt % or from 15 to 30 wt %.

Where the functional monomer is a polyol, the functional monomer may be present as a proportion of the dry weight of the polyol component in an amount of from 5 to 100 wt %, such as from 10 to 50 wt % or from 15 to 30 wt %.

The functional monomer may be present as a proportion of the dry weight of the combined polyacid and polyol components in an amount of from 1 to 50 wt %, such as from 3 to 30 wt % or from 5 to 20 wt %.

The functional compound may be a small molecule. When used herein, "small molecule" in relation to the functional compound means a functional compound having a molecular weight of less than 900 Daltons. Suitable examples of a small molecule functional compounds include but are not limited to: water, ethylene glycol (EG), diethylene glycol (DEG), 1,2-propylene glycol (PG), 2-methyl propanediol (2-MPD), neopentyl glycol (NPG), 1,4-cyclohexane dimethanol (CHDM), 2,2,4,4-tetramethytcyclobutane-1,3-diol (TMCD), butyl ethyl propane diol (BEPD), trimethylolpropane (TMP), tris(2-hydroxyethyl)isocyanurate (THEIC), 1,6 hexanediol, dihydroxyacetone, dimethylolpropionic acid, allyl alcohol, 3-buten-1-ol, crotyl alcohol, 4-pentene-1-ol, trimethylolpropane monoallyl ether, 1,2-diaminoethane, 1,6-diaminohexane, isophoronediamine, ethanolamine, diethanolamine, melamine, cysteine, cystamine, 2-aminoethanethiol, 2-mercaptoethanol, 1,3-propanedithiol, mercaptosuccinic acid, serine, proline, lysine, aspartic acid, maleic acid, maleic anhydride, fumaric acid, itaconic anhydride, or itaconic acid.

The small molecule functional compound may comprise ethylene glycol (EG), diethylene glycol (DEG), 1,2-propylene glycol (PG), 2-methyl propanediol (2-MPD), neopentyl glycol (NPG), 1,4-cyclohexane dimethanol (CHDM), 2,2,4,4-tetramethytcyclobutane-1,3-diol (TMCD), butyl ethyl propane diol (BEPD), 1,6 hexanediol, mercaptosuccinic acid, aspartic acid, maleic acid, maleic anhydride, fumaric acid, itaconic anhydride, and/or itaconic acid.

The high Mn polyester and the functional compound react during melt blending in the above-mentioned method, the reaction may be transesterification, amidation and/or thioesterification of the functional compound with the high Mn polyester. The functional compound may comprise functional group Z operable to react with the high Mn polyester during the melt blending step, such as with a carboxylic acid ester of the high Mn polyester. Functional group Z may be an amine group, an epoxy group, a thiol group, an anhydride group, a hydroxy group and/or a carboxy group, such as a hydroxy group and/or a carboxy group, or a hydroxy group. When the functional compound is a polymer the terminal groups of the backbone of the functional compound may be amine groups, thiol groups, hydroxy groups and/or carboxy groups, such as hydroxy groups. Functional group Z may be the same as or different to functional group Y.

The Mn of the functional compound may be ≤6,000 Da or ≤4,000 Da, such as ≤3,500 Da, or ≤3,000 Da.

The Mn of the functional compound when a polymer may be ≥500 Da, such as ≥1,000 Da, or ≥1,500 Da.

The weight average molecular weight (Mw) of the functional compound may be ≤50,000 Da, such as ≤25,000 Da, or ≤15,000 Da.

The functional compound may be a polymer having a number of functional groups Y per chain of ≥0.5, such as ≥1, or ≥1.2, or ≥1.5, or ≥2, or ≥3 such as ethylenic unsaturation per chain.

Where the functional compound is a polymer, the functional compound may have a gross hydroxyl value (OHV) of ≥20 mg KOH/g, such as ≥40 mg KOH/g, or ≥50 mg KOH/g.

Where the functional compound is a polymer, the functional compound may have an acid value (AV) of ≥3 mg KOH/g, such as ≥10 mg KOH/g, or ≥20 mg KOH/g.

Where the functional compound is polymer, the functional compound may have a thiol equivalent weight of ≤2,500 g/equivalent, such as ≤1,000 g/equivalent, or ≤100 g/equivalent.

Where the functional compound is polymer, the functional compound may have an amine equivalent weight of ≤2,500 g/equivalent, such as ≤1,000 g/equivalent, or ≤100 g/equivalent.

The Tg or melting point of the functional compound, as appropriate, may be from −60° C. to 150° C., or 20° C. to 100° C., or 50° C. to 70° C.

The composition may comprise ≥0.1% of the functional compound by total dry weight of the composition, such as ≤0.5%, or ≥1 wt %, such as ≥2 wt %, or ≥3 wt %, or ≥4 wt %.

The composition may comprise ≤60% of the functional compound by total dry weight of the composition, such as ≤55 wt %, or ≤50 wt %.

The mole ratio of functional compound to high Mn polyester in the composition may be from 27:1 to 1:142, such as from 7:1 to 1:7, or from 1.25:1 to 1:2.5.

The composition may further comprise a catalyst operable to catalyse the reaction between the high Mn polyester and the functional compound. The catalyst may be a transesterification catalyst, an amidation catalyst, or a thioesterification catalyst. The catalyst may be a metal catalyst, such as tin, bismuth, zirconium; an acid catalyst, such as phosphoric acid, sulfuric acid, sulfonates; and/or a base catalyst, such as sodium hydroxide, sodium acetate, caesium acetate.

The catalyst may be present in the composition in an amount of from 0.001% to 1% by total dry weight of the composition, such as from 0.01 to 0.7%, or from 0.025 to 0.5% by dry weight of the composition.

The composition may further comprise a radical inhibitor, such as an antioxidant, for example a phenolic antioxidant. The antioxidant may be present in the composition in an amount of from 0.001 to 1% by total dry weight of the composition, such as from 0.01 to 0.7%, or from 0.025 to 0.5% by dry weight of the composition.

The composition may further comprise a hydrocarbon based carrier, such as an aliphatic hydrocarbon based carrier, for example a mineral oil. The hydrocarbon based carrier may be present in the composition in an amount of from 0.1 to 5% by total dry weight of the composition, such as from 0.2 to 2%, or from 0.25 to 1%.

The composition may have a solids content of ≥90% by total weight of the composition, such as ≥95, or ≥98%.

The functional polyester produced by the above-mentioned method may be a thermoset polyester. The functional polyester produced by the method may be for use in a coating composition. The functional polyester may be an organic solvent soluble polyester. The functional polyester may have a solubility of at least 0.1 g in 10 mL of the chosen solvent or solvent mixture, such as tetrahydrofuran, or a dibasic ester, for example aromatic 100, at standard ambient temperature and pressure (25° C. and 1 atm), such as ≥1 g in 10 mL, or ≥6 g in 10 mL, or ≥9 g in 10 mL, or ≥12 g in 10 mL.

The functional polyester comprises functional group X. When used herein, the term "functional" in relation to the functional polyester means only that the functional polyester comprises at least functional group X and the use of the term "functional" in this context implies no other limitation to the said functional polyester produced by the above-mentioned method.

The functional polyester may have a Mn that is higher than the Mn of the functional compound. The functional polyester may have a Mn that is different to the Mn of the high Mn polyester and higher than the Mn of the functional compound. For example, the functional polyester may have an intermediate Mn that is less than the Mn of the high Mn polyester and greater than the Mn of the functional compound.

The Mn of the functional polyester may be ≥4,000 Da, or ≥5,000 Da, such as ≥6,000, or ≥7,000 Da.

The Mn of the functional polyester may be ≤15,000 Da, such as ≤12,000, or ≤10,000 Da.

The Mw of the functional polyester may be ≥5,000 Da, or ≥7,000 Da, such as ≥9,000, or ≥11,000 Da.

The Mw of functional polyester may be ≤50,000 Da, such as ≤25,000, or ≤20,000 Da.

Functional group X of the functional polyester produced by the above-mentioned method may be operable to react with an acrylic polymer such as to graft the acrylic polymer onto the polyester via functional group X. Functional group X of the functional polyester may be ethylenic unsaturation, an ether group, an amide group, an amine group, a ketone group, a hydroxyl group and/or an acid group, such as ethylenic unsaturation, a hydroxyl group and/or a carboxylic acid group, or ethylenic unsaturation.

The functional polyester may comprise more functional groups X per chain than the high Mn polyester. The functional polyester may comprise more ethylenically unsaturated groups per chain than the high Mn polyester, a higher AV than the high Mn polyester, a higher OHV than the high Mn polyester, a lower thiol equivalent weight than the high Mn polyester and/or a lower amine equivalent weight than the high Mn polyester.

The functional polyester may have a number of functional groups X per chain of ≥0.5, such as ≥1, such as ≥1.1, or ≥1.2, or ≥1.5, such as ethylenic unsaturation per chain.

The functional polyester may have a gross hydroxyl value (OHV) of ≥5 mg KOH/g, such as ≥10 mg KOH/g, or ≥15 mg KOH/g.

The functional polyester may have an acid value (AV) of ≥1 mg KOH/g, such as ≥3 mg KOH/g, or ≥5 mg KOH/g, or ≥10 mg KOH/g, or ≥30 mg KOH/g.

The functional polyester may have a thiol equivalent weight of ≤100,000 g/equivalent, such as ≤10,000 g/equivalent, or ≤5,000 g/equivalent.

The functional polyester may have an amine equivalent weight of ≤100,000 g/equivalent, such as ≤10,000 g/equivalent, or ≤5,000 g/equivalent.

The Tg of the functional polyester may be from −60° C. to 200° C., such as −30° C. to 120° C., such as 20° C. to 100° C., or 30° C. to 80° C.

The composition, the high Mn polyester and/or the functional compound may be dried before melt blending. The composition may be homogenised before melt blending.

The composition may be melt blended in an apparatus capable of melt-blending (or melt-mixing) the high Mn polyester and the functional compound. A melt-mixer apparatus or extruder apparatus are examples of suitable apparatuses. A melt-mixer apparatus typically comprises a heated cavity with mixing paddles therein. An extruder apparatus typically comprises of a solids hopper and optionally liquid feed apparatus(es) which feed into a heated barrel containing one or two rotating screws. These screws typically have a modular design such that various mixing elements may be combined to modulate the mixing, shear, and mass transport of the extrudate. In the case of a twin-screw extruder, the screws may be co-rotating or counter-rotating. The extruder barrel typically is divided into several zones in which the temperature can be controlled independently. Typically the extruder barrel contains ports which allow for the addition of liquid materials or alternatively the application of vacuum to remove liquids and gases. At the end of the extruder barrel is typically a mechanism or a series of mechanisms for collecting, shaping, and or sizing the extrudate such as a chilled roll, water bath, or conveyer belt.

The settings of the process, such as temperature, screw or paddle rotational speed, feed rate, residence time should be set in a manner sufficient to cause the desired reaction between the high Mn polyester and the functional compound. One skilled in the art will appreciate that the exact levels of these setting will vary based on the equipment and the materials used. For instance, extruders come in various sizes from small bench top instruments to large commercial production scale instruments. While similar materials can be produced, the process setting will vary with the size of the equipment. Likewise, the material properties of materials that can be used vary widely and would require that the process setting are adjusted accordingly, for example the melt temperature or desired processing temperature will be different for different high Mn polyesters.

The method may comprise reactive extrusion of the composition.

For an extruder, the feed zone temperature of the apparatus may be from 20° C. to 350° C., such as from 150° C. to 300° C., or 220° C. to 260° C.

The melt blending temperature of the apparatus may be from 90° C. to 375° C., such as from 150° C. to 350° C., or from 200° C. to 325° C., or 250° C. to 300° C.

The residence time may be from 0.25 to 20 minutes, such as from 1 to 10 minutes, or from 1.5 to 5 minutes.

The screw or mixing paddle rotation during melt blending of the composition may be from 20 to 2,000 rpm, such as from 30 to 1,200 rpm, or from 50 to 500 rpm. [121] The melt blended composition may be extruded. The melt blended composition may be extruded into a cooling apparatus such as a water bath or chilled roller.

The functional polyester produced by the above-mentioned method may be dried.

The inventors had found that using batch processing to produce functional polyesters having the desired mechanical properties from the monomer components can be difficult and time consuming.

The inventors have surprisingly found that the above-mentioned method of the present invention can produce functionalised polyesters having excellent mechanical properties in a manner that is significantly quicker than a batch production method. The method also allows for a wide range of straightforward variation in the functional polyester produced. Furthermore, the method allows for the utilisation of materials that were previously not suitable for use in coating compositions. For example, a high Mn polyester intended for use in moulding plastic bottles and not suitable for use in a coating composition can be applied in the above-mentioned method to produce a polyester that has the functionality and physical properties required for use in a coating composition. In addition, the high Mn polyester can be recycled as well as virgin polyester, enabling the reuse of polyester materials in a different application to the original purpose.

Further still, the above-mentioned method can produce a functionalized polyester with less degradation and fewer by-products. A typical batch reaction with an unsaturated monomer will lose unsaturation functionality over time due to side reactions. The short cycle time required by the above-mentioned method means that there is less time for side reactions.

The acrylic polymer of the acrylic polyester may be grafted onto the functional polyester by polymerizing acrylic monomers in the presence of the functional polyester to form the acrylic polyester.

The solvent of the solvent solution may comprise an organic solvent or a mixture of organic solvents either alone or in combination with water. The solvent solution may comprise at least 50% organic solvent by total solvent weight.

The organic solvent may have a sufficient volatility to essentially entirely evaporate from the coating composition during the curing process. As a non-limiting example, the curing process may occur at ambient temperatures, such as room temperature, such as from 5° C. to 40° C., for from 5 minutes to 7 days. As a non-limiting example, the curing process may be by heating at from 40° C. to 140° C. for from 5 to 40 minutes or from 190° C. to 425° C. for from 5 to 10 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100,150,200; those available from Exxon-Mobil Chemical Company under the SOLVESSO® trade name; alcohols such as ethanol; n-propanol; isopropanol; and n-butanol; ketones such as acetone; cyclohexanone; methyl isobutyl ketone; methyl ethyl ketone; esters such as ethyl acetate; butyl acetate; n-hexyl acetate; RHODIASOLV® RPDE (a blend of succinic and adipic esters commercially available from Solvay); glycols such as butyl glycol; glycol ethers such as methoxypropanol; ethylene glycol monomethyl ether; ethylene glycol monobutyl ether and combinations thereof. The solvent, when present, may be used in the coating composition in amounts from 5 to 90 wt %, such as from 10 to 80 wt %, such as from 20 to 75 wt %, or even from 30 to 70 wt % based on the total weight of the coating composition. The solvent, when present, may be used in the coating composition in amounts from 50 to 70 wt % based on the total weight of the coating composition.

The functional polyester may be dissolved or dispersed in the said solvent during and/or after its formation.

The coating composition may comprise a crosslinking material. The coating composition may comprise any suitable crosslinking material. Suitable crosslinking materials will be well known to the person skilled in the art.

The crosslinking material may be operable to crosslink the functional polyester.

The crosslinking material may be a single molecule, a dimer, an oligomer, a (co)polymer or a mixture thereof. The crosslinking material may be a dimer or trimer.

Suitable crosslinking materials include, but are not limited to: phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; and/or polyamides and combinations thereof.

Suitable examples of phenolic resins are those formed from the reaction of a phenol with an aldehyde or a ketone, such as from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. The phenolic resins may be of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Allnex, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Sumitomo Bakelite co., ltd., such as BAKELITE 6582 LB, BAKELITE 6535, BAKELITE PF9989 or BAKELITE PF6581; SFC 112 commercially available from SI Group; DUREZ® 33356 commercially available from SHHPP; ARALINK® 40-852 commercially available from Bitrez; or combinations thereof.

Suitable examples of isocyanate resins include, but are not limited to the following: isophorone diisocyanate (IPDI), such as those sold under the trade name DESMODUR® commercially available from Covestro, for example DESMODUR VP-LS 2078/2 or DESMODUR PL 340 or those sold under the trade name VESTANAT® commercially available from Evonik, for example VESTANANT B1370, VESTANAT B118 6A or VESTANAT B1358 A; blocked aliphatic polyisocyanate based on hexamethylene diisocyanate (HDI), such as those sold under the trade name DESMODUR® commercially available from Covestro, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Vencorex Chemicals, for example TOLONATE D2 or those sold under the trade name TRIXENE® commercially available from Baxenden, for example TRIXENE-BI-7984 or TRIXENE 7981; or combinations thereof.

The crosslinking material may contain nitrogen. The crosslinking material may be in the form of an amine or amide material. The crosslinking material may comprise a hydroxyl substituted amine or amide material.

The crosslinking material may comprise a hydroxyalkyi-amide material, such as a β-hydroxyalkylamide material.

The crosslinking material may contain a terminal chemical group as shown in Formula I.

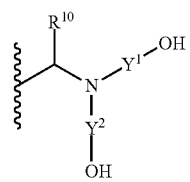

Formula I wherein $R^{10}$ represents an electron withdrawing group, such as (=O); and $Y^1$ and $Y^2$ each, independently, represents a $C_1$ to $C_3$ alkylene group.

The terminal chemical group of Formula I may be connected to a further chemical structure, not shown. Additionally or alternatively, the chemical group of formula I may be suspended from a carrier substrate, such as a silica carrier substrate, for example.

The crosslinking material may contain a plurality of terminal chemical groups as shown in Formula I. For example, the crosslinking material may contain 2, 3 or 4 terminal chemical groups as shown in Formula I.

The crosslinking material may comprise a moiety according to Formula II:

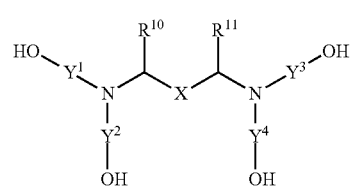

Formula II wherein $R^{10}$ and $R^{11}$ each, independently, represent an electron withdrawing group, such as (=O);

$Y^1$, $Y^2$, $Y^3$ and $Y^4$ each, independently, represent a $C_1$ to $C_3$ alkylene group; and X represents a $C_2$ to $C_6$ alkylene group.

each of $R^{10}$ and $R^{11}$ may represent a (=O) group.

Each of $Y^1$, $Y^2$, $Y^3$ and $Y^4$ may represent an ethylene group.

X may represent a butylene group.

Accordingly, the crosslinking material may comprise a material of formula III:

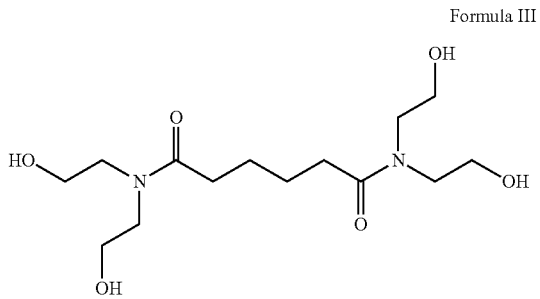 [SMILES: O=C(CCCCC(=O)N(CCO)CCO)N(CCO)CCO]

Formula III

The crosslinking material may comprise a commercially available β-hydroxyalkylamide crosslinking, such as, for example, PRIMID XL-552 (available from EMS); PRIMID QM-1260 (available from EMS Chemie); and N,N,N',N'-tetrakis(2-hydroxypropyl)adipamide.

The crosslinking material may be in the form of a urea material. The crosslinking material may comprise a hydroxyl substituted urea material. The crosslinking material may comprise a hydroxy functional alkyl polyurea material.

The hydroxy functional alkyl polyurea material may comprise a material having the formula:

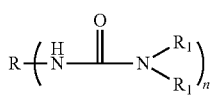

wherein R comprises an isocyanurate moiety, biuret moiety, allophonate moiety, glycoluril moiety, benzoguanamine moiety, polyetheramine moiety, and/or polymeric moiety different from a polyetheramine and having an Mn of 500 or greater; wherein each R1 is independently a hydrogen, alkyl having at least 1 carbon, or a hydroxy functional alkyl having 2 or more carbons and at least one R1 is a hydroxy functional alkyl having 2 or more carbons; and n is 2-6.

The hydroxy functional alkyl polyurea material may comprise a material having the formula:

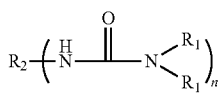

wherein R2 is a substituted or unsubstituted C1 to C36 alkyl group, an aromatic group, an isocyanurate moiety, biuret moiety, allophonate moiety, glycoluril moiety, benzoguanamine moiety, polyetheramine moiety, and/or polymeric moiety different from a polyetheramine and having an Mn of 500 or greater; wherein each R1 is independently a hydrogen, an alkyl having at least 1 carbon, or a hydroxy functional alkyl having 2 or more carbons and at least one R1 is a hydroxyl functional alkyl having 2 or more carbons; and n is 2-6.

Further details of suitable hydroxy functional alkyl polyurea materials are disclosed in PCT patent application WO 2017/123955, the entire contents of which are fully incorporated herein by reference.

Suitable examples of aminoplast resins include those which are formed by reacting a triazine such as melamine or benzoguanamine with formaldehyde. These condensates may be etherified, typically, with methanol, ethanol, butanol or mixtures thereof. For the chemistry, preparation and use of aminoplast resins, see "The Chemistry and Applications of Amino Crosslinking agents or Aminoplast", Vol. V, Part 11, page 21 ff., edited by Dr. Oldring; John Wiley & Sons/Cita Technology Limited, London, 1998. Suitable examples of commercially available aminoplast resins include, but are not limited to, those sold under the trade name MAPRENAL (registered trade mark), such as MAPRENAL MF980 (commercially available from Ineos); those sold under the trade name CYMEL (registered trade mark), such as CYMEL 303 and CYMEL 1123 (available from Allnex Industries); and combinations thereof.

The crosslinking material may be present in the coating composition in any suitable amount.

The coating compositions may comprise at least 0.5 wt % crosslinking material based on the total solid weight of the coating composition. Such as at least 1 wt %, at least 5 wt %, at least 10 wt %, at least 15 wt %, or at least 20 wt % crosslinking material based on the total solid weight of the coating composition.

The coating compositions may comprise up to 70 wt % crosslinking material based on the total solid weight of the coating composition. Such as up to 60 wt %, up to 50 wt %, up to 40 wt %, up to 30 wt %, up to 25 wt %, or up to 20 wt % crosslinking material based on the total solid weight of the coating composition.

The coating composition may comprise from 0.5 to 90 wt %, or 1 to 90 wt %, such as from 1 to 80 wt %, such as from 1 to 70 wt %, such as from 1 to 60 wt %, such as from 1 to 50 wt %, such as from 1 to 40 wt %, such as from 1 to 30 wt %, or even from 1 to 25 wt % crosslinking material based on the total solid weight of the coating composition. The coating composition may comprise from 5 to 90 wt %, such as from 5 to 80 wt %, such as from 5 to 70 wt %, such as from 5 to 60 wt %, such as from 5 to 50 wt %, such as from 5 to 40 wt %, such as from 5 to 30 wt %, or even from 5 to 25 wt % crosslinking material based on the total solid weight of the coating composition. The coating composition may comprise from 10 to 90 wt %, such as from 10 to 80 wt %, such as from 10 to 70 wt %, such as from 10 to 60 wt %, such as from 10 to 50 wt %, such as from 10 to 40 wt %, such as from 10 to 30 wt %, or even from 10 to 25 wt %, or 5 to 20 wt %, crosslinking material based on the total solid weight of the coating composition. The coating composition may comprise from 15 to 90 wt %, such as from 15 to 80 wt %, such as from 15 to 70 wt %, such as from 15 to 60 wt %, such as from 15 to 50 wt %, such as from 15 to 40 wt %, such as from 15 to 30 wt %, or even from 15 to 25 wt % crosslinking material based on the total solid weight of the coating composition. The coating composition may comprise from 20 to 90 wt %, such as from 20 to 80 wt %, such as from 20 to 70 wt %, such as from 20 to 60 wt %, such as from 20 to 50 wt %, such as from 20 to 40 wt %, such as from 20 to 30 wt %, or even from 20 to 25 wt % crosslinking material based on the total solid weight of the coating composition.

The coating composition may comprise from 15 to 25 wt % crosslinking material based on the total solid weight of the coating composition.

The crosslinking material may comprise an aminoplast resin.

The crosslinking material may comprise material according to formula (XIII)

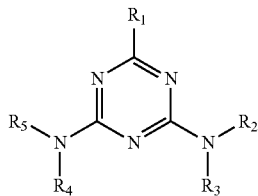

(XIII)

wherein $R_1$ represents hydrogen, alkyl (such as $C_1$ to $C_{20}$ alkyl), aryl (such as $C_4$ to $C_{24}$ aryl), aralkyl (such as $C_5$ to $C_{25}$ aralkyl), or —$NR_6R_7$;

$R_2$ to $R_7$ each independently represent hydrogen, alkyl (such as $C_1$ to $C_{20}$ alkyl), aryl (such as $C_4$ to $C_{24}$ aryl), aralkyl (such as $C_5$ to $C_{25}$ aralkyl) or —$CHR_8OR_9$;

wherein $R_8$ and $R_9$ each independently represent hydrogen, alkyl (such as $C_1$ to $C_{20}$ alkyl), aryl (such as $C_4$ to C24 aryl), aralkyl (such as $C_5$ to $C_{25}$ aralkyl), alkoxyalkyl (such as $C_2$ to $C_{40}$ alkoxyalkyl) or an alkaryl (such as $C_5$ to $C_{25}$ alkaryl);

wherein at least one of $R_2$ to $R_5$, or $R_2$ to $R_7$ when present, is —$CHR_8OR_9$, for example all of $R_2$ to $R_5$, or $R_2$ to $R_7$ when present, may be —$CHR_8OR_9$.

In the crosslinking material according to formula (XIII), $R_1$ may be $C_1$ to $C_{20}$ alkyl, $C_4$ to $C_{24}$ aryl, $C_5$ to $C_{25}$ aralkyl, or —$NR_6R_7$; such as $C_4$ to $C_{24}$ aryl or $C_5$ to $C_{25}$ aralkyl, or $C_4$ to $C_{24}$ aryl, such as $C_4$ to $C_{12}$ aryl, such as $C_6$ aryl.

In the crosslinking material according to formula (XIII), $R_1$ may be —$NR_6R_7$.

In the crosslinking material according to formula (XIII), $R_2$ to $R_7$, when present as applicable, may each be independently hydrogen, $C_1$ to $C_{20}$ alkyl, $C_4$ to $C_{24}$ aryl or —$CHR_8OR_9$; such as hydrogen, $C_1$ to $C_{20}$ alkyl or —$CHR_8OR_9$, such as hydrogen, C1 to C10 alkyl or —$CHR_8OR_9$; such as $C_1$ to $C_5$ alkyl or —$CHR_8OR_9$, such as —$CHR_8OR_9$.

In the crosslinking material according to formula (XIII), $R_2$ to $R_7$, when present as applicable, may each be independently hydrogen, $C_1$ to $C_{20}$ alkyl, $C_4$ to $C_{24}$ aryl or —$CHR_8OR_9$; such as hydrogen, $C_1$ to $C_{20}$ alkyl or —$CHR_8OR_9$, such as hydrogen, $C_1$ to $C_{10}$ alkyl or —$CHR_8OR_9$; such as $C_1$ to $C_5$ alkyl or —$CHR_8OR_9$, such as —$CHR_8OR_9$, and $R_8$ may be independently be hydrogen, $C_1$ to $C_{20}$ alkyl, $C_4$ to $C_{24}$ aryl, $C_5$ to $C_{25}$ aralkyl, alkoxyalkyl $C_2$ to $C_{40}$ alkoxyakyl or $C_5$ to $C_{25}$ alkaryl, such as hydrogen, $C_1$ to $C_{20}$ alkyl, such as hydrogen; and $R_9$ may be hydrogen, $C_1$ to $C_{20}$ alkyl, $C_4$ to $C_{24}$ aryl, $C_5$ to $C_{25}$ aralkyl, alkoxyalkyl $C_2$ to $C_{40}$ alkoxyalkyl or $C_5$ to $C_{25}$ alkaryl; such as hydrogen, $C_1$ to $C_{20}$ alkyl; such as $C_1$ to $C_{20}$ alkyl, or $C_1$ to $C_{10}$ alkyl, or $C_1$ to $C_5$ alkyl, such as $C_1$ or $C_2$ alkyl.

The crosslinking material according to formula (XIII) may be formed by reacting a triazine such as melamine or benzoguanamine with formaldehyde. These condensates may be etherified, typically, with methanol, ethanol, butanol or mixtures thereof. For the chemistry, preparation and use of aminoplast resins, see "The Chemistry and Applications of Amino Crosslinking agents or Aminoplast", Vol. V, Part 11, page 21 ff., edited by Dr. Oldring; John Wiley & Sons/Cita Technology Limited, London, 1998.

The crosslinking material according to formula (XIII) may comprise melamine or derivatives thereof, such as butylated and/or methylated melamine; and/or benzoguanamine or derivatives thereof, such as butylated and/or methylated benzoguanamine. The crosslinking material according to formula (XIII) may comprise benzoguanamine or derivatives thereof, such as butylated and/or methylated benzoguanamine.

The crosslinking material according to formula (XIII) may form at least 50 wt % of the crosslinking material of the coating composition, such as at least 60 wt %, at least 70 wt %, at least 80 wt %, at least 90 wt %, at least 95 wt % or at least 98 wt % such as at least 99 wt % of the crosslinking material of the coating composition.

The crosslinking material may comprise those which are formed by reacting a triazine, such as melamine or benzoguanamine, with formaldehyde.

The crosslinking material may comprise benzoguanamine or a derivative thereof.

The benzoguanamine or derivative thereof may comprise commercially available benzoguanamine or derivative thereof. Suitable examples of commercially available benzoguanamine and its derivatives include, but are not limited to benzoguanamine-formaldehyde based materials such as those sold under the trade name CYMEL (registered trade mark), for example CYMEL 1123 (commercially available from Allnex Industries), those sold under the trade name ITAMIN (registered trade mark), for example ITAMIN BG143 (commercially available from Galstaff Multiresine) or those sold under the trade name MAPRENAL (registered trade mark), for example, MAPRENAL BF892 and MAPRENAL BF 892/68B (commercially available from Ineos); glycoluril based materials, such as those sold under the trade name CYMEL (registered trade mark), for example, CYMEL 1170 and CYMEL 1172 (commercially available from Allnex); and combinations thereof.

The benzoguanamine or derivative thereof may comprise benzoguanamine-formaldehyde based materials sold under the trade name MAPRENAL (registered trade mark).

The benzoguanamine or derivative thereof may comprise MAPRENAL BF892 and/or MAPRENAL BF 892/68B (commercially available from Ineos). Benzoguanamine or derivative thereof may comprise MAPRENAL BF 892/68B (commercially available from Ineos).

The coating composition may comprise from 15 to 25 wt % benzoguanamine or derivative thereof based on the total solid weight of the coating composition.

The coating compositions may further comprise a catalyst. Any catalyst typically used to catalyse crosslinking reactions between polyester materials and crosslinking agents may be used. Suitable catalysts will be well known to the person skilled in the art. The catalyst may be a non-metal or a metal catalyst or a combination thereof. Suitable non-metal catalysts include, but are not limited to the following: phosphoric acid; blocked phosphoric acid; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris(2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof. The catalyst, when present, may be used in the coating composition in any suitable amount. The catalyst, when present, may be used in amounts from 0.001 to 10 wt %, such as from 0.001 to 5 wt %, such as from 0.01 to 5 wt %, or even from 1 to 3 wt % based on the total solid weight of the coating composition. The catalyst, when present, may be used in amounts from 0.01 to 1.5 wt % based on the total solid weight of the coating composition.

Suitable examples of catalysts, for example for compositions containing an acrylic polyester resin, may include, but are not limited to the following: metal compounds such as stannous octoate; stannous chloride; butyl stannoic acid (hydroxy butyl tin oxide); monobutyl tin tris(2-ethylhexanoate); chloro butyl tin dihydroxide; tetra-n-propyl titanate; tetra-n-butyl titanate; zinc acetate; acid compounds such as phosphoric acid; para-toluene sulphonic acid; dodecyl benzene sulphonic acid (DDBSA) such as blocked DDBSA, tetra alkyl zirconium materials, antimony trioxide, germanium dioxide and combinations thereof. The catalyst may comprise dodecyl benzene sulphonic acid (DDBSA), such as blocked DDBSA.

The catalyst may be present in the aqueous coating composition in amounts from 0.001 to 1% by dry weight of the aqueous coating composition coating composition, such as from 0.01 to 0.7%, such as from 0.025 to 0.5% by dry weight of the aqueous coating composition.

The coating compositions may comprise a further resin material. Suitable further resin materials will be well known to a person skilled in the art. Suitable examples of further resin materials include, but are not limited to the following: polyester resins; acrylic resins; polyvinyl chloride (PVC) resins; alkyd resins; polyurethane resins; polysiloxane resins; epoxy resins or combinations thereof.

The coating compositions may comprise other optional materials well known in the art of formulating coatings, such as colorants, plasticizers, abrasion-resistant particles, antioxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts colour and/or other opacity and/or other visual effect to the composition. The colorant can be added to the coating composition in any suitable form, such as discrete particles, dispersions, solutions and/or flakes. A single colorant or a mixture of two or more colorants can be used in the coatings. Suitable colorants are listed in U.S. Pat. No. 8,614,286, column 7, line 2 through column 8, line 65, which is incorporated by reference herein. Suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein. The colorant, when present, may be used in the coating composition in any suitable amount. The colorant, when present, may be used in the coating composition in amounts up to 90 wt %, such as up to 50 wt %, or even up to 10 wt % based on the total solid weight of the coating composition.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. The surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, such as from 0.01 to 5 wt %, such as from 0.01 to 2 wt % based on the total solid weight of the coating composition. [181] The coating compositions may be substantially free, may be essentially free or may be completely free of bisphenol A (BPA) and derivatives thereof. Derivatives of bisphenol A include, for example, bisphenol A diglycidyl ether (BADGE). The coating compositions may be substantially free or completely free of bisphenol F (BPF) and derivatives thereof. Derivatives of bisphenol F include, for example, bisphenol F diglycidyl ether (BPFG). The compounds or derivatives thereof mentioned above may not be added to the coating composition intentionally but may be present in trace amounts because of unavoidable contamination from the environment. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The high Mn polyester, the functional compound, the functional polyester and/or coating compositions may be substantially free, may be essentially free or may be completely free of bisphenol A (BPA) and derivatives thereof. Derivatives of bisphenol A include, for example, bisphenol A diglycidyl ether (BADGE). The high Mn polyester, the functional compound, the functional polyester and/or coating compositions may be substantially free or completely free of bisphenol F (BPF) and derivatives thereof. Derivatives of bisphenol F include, for example, bisphenol F diglycidyl ether (BPFG). The compounds or derivatives thereof mentioned above may not be added to the coating composition intentionally but may be present in trace amounts because of unavoidable contamination from the environment. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The high Mn polyester, the functional compound, the functional polyester and/or coating compositions may comprise a dialkyltin compound, for example when used in non-packaging applications. The high Mn polyester, the functional compound, the functional polyester and/or coating compositions may be substantially free, may be essentially free or may be completely free of dialkyltin compounds, including oxides or other derivatives thereof, for example when used in packaging applications. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The high Mn polyester, the functional compound, the functional polyester and/or coating compositions may be substantially free of styrene. The coating compositions may be essentially free or may be completely free of styrene. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The high Mn polyester, the functional compound, the functional polyester and/or coating compositions may be substantially phenol free, or essentially phenol free, or completely phenol free. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The high Mn polyester, the functional compound, the functional polyester and/or coating compositions may be substantially formaldehyde free, or essentially formaldehyde free, or completely formaldehyde free. By "substantially free" we mean to refer to high Mn polyester, the functional compound, the functional polyester and/or coating compositions containing less than 1000 parts per million (ppm) of any of the compounds or derivatives thereof mentioned above. By "essentially free" we mean to refer to high Mn polyester, the functional compound, the functional polyester and/or coating compositions containing less than 100 ppm of any of the compounds or derivatives thereof mentioned above. By "completely free" we mean to refer to high Mn polyester, the functional compound, the functional polyester and/or coating compositions containing less than 20 parts per billion (ppb) of any of the compounds or derivatives thereof.

The coating composition may have any suitable solids content. The coating composition may have a solids content of from 10 to 60% by weight of the coating composition, such as from 15 to 50 wt % or from 20 to 40 wt %.

The high Mn polyester, functional compound, coating composition and/or the cured film derived from the coating composition may exclude 2,2,4,4-tetramethyl-1-3-cyclobutane diol ("TMCD"). The definition of the polyol component and/or diol component may exclude 2,2,4,4-tetramethyl-1-3-cyclobutane diol ("TMCD").

The substrate may be formed of metal, plastic, composite and/or wood. The substrate may be a metal substrate.

The substrate may be an article such as an automotive product, an aerospace product, a marine product, a household or office appliance, furniture item or tool, a powered industrial product, a consumer electronics article, an architectural product or a product protected by an intumescent coating.

Examples of suitable metal substrates include, but are not limited to, food and/or beverage packaging, components used to fabricate such packaging or monobloc aerosol cans and/or tubes.

The food and/or beverage packaging may be a can. Examples of cans include, but are not limited to, two-piece cans, three-piece cans and the like. Suitable examples of monobloc aerosol cans and/or tubes include, but are not limited to, deodorant and hair spray containers. Monobloc aerosol cans and/or tubes may be aluminium monobloc aerosol cans and/or tubes.

The substrate may be a food and/or beverage packaging or component used to fabricate such packaging.

The substrate may be a monobloc aerosol can and/or tube.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans.

The powder coatings are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The substrate may be a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. The coating could also be applied as a rim coat to the bottom of the can. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated. Coil coatings also typically comprise a colorant.

The coating composition may be applied to at least a portion of the metal substrate. For example, when the coating composition is applied to a monobloc aerosol tube and/or can, the coating composition may be applied to at least a portion of an internal surface of said tube and/or can.

The coating composition may be applied as a repair coating for component parts of food and beverage cans. For example, as a repair coating for a full aperture easy open end for food cans. This end component may repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

An automotive product may be a vehicle or any part thereof. Any part or any surface of the vehicle which may undergo coating to improve a property thereof (for example its luster, scratch resistance, corrosion resistance or UV resistance) may be a coating with a composition as defined herein.

The term "vehicle" is used in its broadest sense and includes (without limitation) all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. Vehicles can include ground vehicles such as, for example, trailers, cars, trucks, buses, coaches, vans, ambulances, fire engines, motorhomes, caravans, go-karts, buggies, fork-lift trucks, sit-on lawnmowers, agricultural vehicles such as, for example, tractors and harvesters, construction vehicles such as, for example, diggers, bulldozers and cranes, golf carts, motorcycles, bicycles, trains, and railroad cars. Vehicles can also include watercraft such as, for example, ships, submarines, boats, jet-skis and hovercraft.

Parts of vehicles coated may include vehicular body parts (e.g., without limitation, doors, body panels, trunk deck lids, roof panels, hoods, roofs and/or stringers, rivets, wheels, landing gear components, and/or skins used on an aircraft), hulls, marine superstructures, vehicular frames, chassis, and vehicular parts not normally visible in use, such as engine parts, motorcycle fairings and fuel tanks, fuel tank surfaces and other vehicular surfaces exposed to or potentially exposed to fuels, aerospace solvents and aerospace hydraulic fluids. Any vehicular parts which may benefit from coating as defined herein may undergo coating, whether exposed to or hidden from view in normal use.

Household and office appliances, furniture items and tools as defined herein are appliances, furniture items and tools used in the home, including the garden, or in office environments. They may include fabric washers, dishwashers, dryers, refrigerators, stoves, microwave ovens, computer equipment and printers, air conditioning units, heat pump units, lawn and garden equipment including lawn furniture, hot tubs, lawnmowers, garden tools, hedge trimmers, string trimmers (strimmers), chainsaws, garden waster shedders, garden hand tools such as, for example, spades, forks, rakes and cutting tools, cupboards, desks, table, chairs, cabinets and other articles. Any parts of any such articles which may benefit from coating as defined herein may undergo coating; for example panels of appliances or furniture and handles of tools.

A powered industrial product may include, for example, pumps, electricity generators, air compressors, industrial heat pumps and air conditioners, batteries and cement mixers. Any parts which benefit from coating as defined herein may undergo coating; for example panels and casings.

A consumer electronics article may be, for example, a computer, computer casing, television, cellphone, pager, camera, calculator, printer, scanner, digital decoder, clock, audio player, headphones or tablet.

An architectural product may be, for example, a door, window, door frame, window frame, beam or support, or a panel, walling item or roofing item used in building construction, or a solar panel, a wind turbine, an oil/gas well, an off-shore rig, a bridge, a storage tank, or in transportation infrastructure or utilities infrastructure.

Products protected by intumescent coatings are typically metallic structures, for example steel structures, which are coating with an intumescent coating. The metallic structures are typically load bearing parts of buildings. Unprotected steel will typically begin to soften at around 425° C. and lose approximately half of its strength by 650° C. Intumescent coatings are employed to retard the temperature increase of the steel, or other substrate. An intumescent coating may be improved by incorporation of the defined acrylic polyester resin into the matrix of the intumescent material prior to its coating onto a metallic substrate to be protected. The acrylic polyester resin may be present in an amount of at least 1 wt %, such as at least 2 wt %, for example at least 4 wt %, or at least 5 wt %. The acrylic polyester resin may be present in an amount of up to 50 wt % by weight, such as up to 30 wt %, for example up to 25 wt %. These definitions refer to the weight of the acrylic polyester resin by weight of the admixed acrylic polyester resin/intumescent matrix material to be applied to a substrate.

Articles coated may fall in two or more of the categories set out above. For example computer equipment may be regarded as a household or as an office item, and as a consumer electronics item. A beam or support—an architectural item—may be coated with an intumescent material.

In the uses defined above a coating composition is typically to coat surfaces and parts thereof (except for the use in an intumescent coating which is an admixture). A part may include multiple surfaces. A part may include a portion of a larger part, assembly, or apparatus. A portion of a part may be coated with an aqueous composition or powder composition as defined herein or the entire part may be coated.

The substrate may be new (i.e., newly constructed or fabricated) or it may be refurbished, such as, for example, in the case of refinishing or repairing a component of an automobile or aircraft.

As mentioned above, the substrate coated may comprise a vehicle. For example, an aqueous or powder composition may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). An aqueous or powder composition may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

The coating compositions may be applied to the substrate, or a portion thereof, as a single layer or as part of a multi layer system. The coating composition may be applied as a single layer. The coating compositions may be applied to an uncoated substrate. For the avoidance of doubt an uncoated substrate extends to a surface that is cleaned prior to application. The coating compositions may be applied on top of another paint layer as part of a multi layer system. For example, the coating composition may be applied on top of a primer. The coating compositions may form an intermediate layer or a top coat layer. The coating composition may be applied as the first coat of a multi coat system. The coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating.

It will be appreciated by a person skilled in the art that the coating composition may be applied before or after forming the article, such as the packaging. For example, the coating composition may be applied to metal substrate which is then shaped and formed into a metal article, or the coating composition may be applied to the preformed article.

The coating compositions may be applied to a substrate once or multiple times.

The coating compositions may be applied to the substrate by any suitable method. Methods of applying the coating compositions will be well known to a person skilled in the art. Suitable application methods for the coating compositions include, but are not limited to the following: electrocoating; spraying; electrostatic spraying; dipping; rolling; brushing; and the like.

The coating compositions may be applied to any suitable dry film thickness. The coating compositions may be applied to a dry film thickness from 2 to 150 microns (μm), such as from 2 to 100 μm or 2 to 50 μm. In the case of intumescent coatings, the coating compositions may be applied up to a dry film thickness of 3 cm.

Further information about suitable application methods of applying suitable coating compositions to substrates will now be given.

An aqueous composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. The metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate may also comprise other suitable non-ferrous metals such as titanium or copper, as well as alloys of these materials.

The part to be coated may be in the shape of a cylinder, such as a pipe, including, for example, a cast iron or steel pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a sol-gel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution.

An aqueous composition may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from an aqueous composition, optionally primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming polymer, crosslinking material and, if a colored base coat or monocoat, pigment. The primer layer(s) may optionally be disposed between the electrocoating layer and the topcoat layer(s). Alternatively, the topcoat layer(s) may be omitted such that the composite comprises the electrocoating layer and primer layer(s).

Moreover, the topcoat layer(s) may be applied directly onto the electrodepositable coating layer. In other words, the substrate may lack a primer layer such that the composite comprises the electrocoating layer and topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

"Powder" and like terms, as used herein, refers to materials that are in the form of solid particulates, as opposed to materials which are in the liquid form.

Powder coating compositions may be applied by any suitable method. Methods of applying said powder coating compositions will be well known to a person skilled in the art. Suitable application methods include, such as electrostatic spraying, or applied by ultra corona discharge for example. The powder coating compositions may be applied by ultra corona discharge.

When the substrate is electrically conductive, the powder coating composition is typically electrostatically applied. Electrostatic spray application generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition.

Powder coating compositions may be applied to any suitable dry film thickness. Powder coating compositions may be applied to a dry film thickness from 0.1 µm (microns) to 1000 µm, such as from 3 µm to 500 µm, such as from 5 µm to 250 µm, or from 5 µm to 150 µm, or from 10 µm to 100 µm.

The powder component may have an average particle size of less than 15 microns (µm). The powder component may have an average particle size of less than 12 µm, such as, less than 10 µm, such as less than 7.5 µm, or even less than 5 µm. For the avoidance of doubt the term "less than" includes particles having the stated average particle size. For example, "less than 15 µm" refers to particles having an average particle size of 15 µm as well as those having an average particle size below this value.

As reported herein, "average particle size" refers to the mean (average) particle size of the total amount of particles in a sample as determined by laser diffraction analysis. The average particle size was determined by a Malvern Mastersizer 2000 particle size analyzer following the instructions described in the Mastersizer 2000 manual.

Particles having these sizes may be produced by any suitable method. Suitable methods will be well known to a person skilled in the art. Examples of suitable methods include, but are not limited to, cold grinding, milling and sieving methods.

Additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings.

It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isolndinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Special effect compositions that may be used in a layer of the multi-layer coating composite include pigments and/or compositions that produce appearance effects such as reflectance, pearlescence, metallic sheen, phosphorescence, fluorescence, photochromism, photosensitivity, thermochromism, mechanochromism (strain sensitive pigmentation), goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

The photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component, have minimal migration out of the coating. Example photosensitive compositions and/or photochromic compositions and methods for making them are identified in U.S. application Ser. No. 10/892,919 filed Jul. 16, 2004 and incorporated herein by reference.

Primer and/or topcoat layer(s) may optionally further comprise corrosion inhibitors. The corrosion inhibitors may comprise any of the corrosion inhibitors discussed above with respect to an aqueous or powder composition, and may further comprise magnesium oxide, magnesium hydroxide, lithium salts, and/or lithium silicates An aqueous or powder composition and/or layers deposited from the same, as well as any pretreatment layer, primer layer or topcoat layer, may be substantially free, essentially free, or completely free of chromium or chromium-containing compounds. As used herein, the term "chromium-containing compound" refers to materials that include trivalent chromium or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When an aqueous or powder composition and/or layers deposited from the same, as well as any pretreatment layer, primer layer or topcoat layer, is substantially free, essentially free, or completely free of chromium, this includes chromium in any form, such as, but not limited to, the trivalent chromium-containing compounds and hexavalent chromium-containing compounds listed above.

An aqueous or powder composition and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in an aqueous or powder composition and/or layers deposited from the same, as well as any pretreatment layer, primer layer or topcoat layer, in such a level that they cause a burden on the environment. The term "substantially free" means that an aqueous or powder composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that an aqueous or powder composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that an aqueous or powder composition and/or layers comprising the same, as well as any pretreatment layer, primer layer or topcoat layer, contain less than 1 ppb of chromium, based on total solids weight of the composition, the layer, or the layers, respectively, if any at all.

The coating deposited from an aqueous or powder composition describe above may be hydrolytically stable, as determined by the Hydrolytic Stability Test Method. As used herein, the "Hydrolytic Stability Test Method" refers to immersing a baked panel in deionized water at a temperature of 90° C. for 24 hours. The panel is then removed and baked in an oven set to 150° F. for 60 minutes to dehydrate the coating film. The panel is then retested for cure according to the Double Acetone Rub Test Method. Whether a coating is considered to be hydrolytically stable is demonstrated by the ability of the coating to retain acetone resistance after being subjected to the water soak compared to the acetone resistance of the coating without the water soak. Specifically, the number of double acetone rubs that the coating survived following the water soak is compared to the number of double acetone rubs the coating survived without exposure to the water soak. A coating is considered to be "hydrolytically stable" if the coating survived a number of double acetone rubs following exposure to the water soak without reaching the underlying substrate equal to at least 60% of the double acetone rubs that the coating was able to survive without exposure to the water soak, with the caveat that if the cured coating survived 100 or more double acetone rubs without exposure to the water soak, then the cured coating was considered to be hydrolytically stable if the coating survived at least 60 double acetone rubs without reaching the substrate. For example, a coating that survived 50 double acetone rubs without exposure to the water soak was considered to be hydrolytically stable if it survived at least 30 double acetone rubs following exposure to the water soak. Although reference is made to the coating prior to exposure to the water soak and after exposure to the water soak, it should be understood that two different coated panels are used with each panel having been coated by the same composition by the same technique and cured under the same conditions (i.e., same oven, oven temperature and baking time).

The coating composition may be cured by any suitable method. The coating composition may be cured by heat curing, radiation curing, or by chemical curing, such as by heat curing. The coating composition, when heat cured, may be cured at any suitable temperature. The coating composition, when heat cured, may be cured to a peak metal temperature (PMT) of 150° C. to 350° C., such as from 175° C. to 320° C., such as from 190° C. to 300° C., or even from 200° C. to 280° C. The coating composition, when heat cured, may be cured at 210° C. or at 260° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. The temperature reached by the metal substrate may be lower that the temperature which is applied thereto.

Curing the coating compositions may form a cured film.

The term "aliphatic" herein means a hydrocarbon moiety that may be straight chain or branched and may be completely saturated, or contain a unit of unsaturation, but which is not aromatic. The term "unsaturated" means a moiety that has double and/or triple bonds. The term "aliphatic" is therefore intended to encompass alkyl, alkenyl or alkynyl groups. An aliphatic group may be interrupted by a heteroatom. The heteroatom is selected from nitrogen, silicon, oxygen and/or sulphur.

"Aliphatic" herein includes alicyclic group which is a saturated or partially unsaturated cyclic aliphatic monocyclic or polycyclic (including fused, bridging and spiro-fused) ring system which has from 3 to 20 carbon atoms, that is an alicyclic group with 3,4,5,6, 7, 8,9,10,11,12,13,14,15, 16,17,18, 19 or 20 carbon atoms. An alicyclic group may comprise from 3 to 15, such as from 3 to 12, or from 3 to 10, or from 3 to 8 carbon atoms, for example from 3 to 6 carbons atoms.

The term "alicyclic" encompasses cycloalkyl, cycloalkenyl and cycloalkynyl groups. It will be appreciated that the alicyclic group may comprise an alicyclic ring bearing a linking or non-linking alkyl substituent, such as $—CH_2-$cyclohexyl. Specifically, examples of the $C_{3-20}$ cycloalkyl group include cyclopropyl, cyclobutyl, cyclopentyl, cyclohexyl, cycloheptyl, adamantyl, isobornyl and cyclooctyl.

The term "alk" or "alkyl", as used herein unless otherwise defined, relates to saturated hydrocarbon radicals being straight, branched, cyclic or polycyclic moieties or combinations thereof and contain 1 to 20 carbon atoms, such as 1 to 10 carbon atoms, such as 1 to 8 carbon atoms, such as 1 to 6 carbon atoms, such as 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or heteroatom, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methyl butyl, pentyl, iso-amyl, hexyl, cyclohexyl, 3-methylpentyl, octyl and the like. The term "akylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly.

The term "alkenyl", as used herein, relates to hydrocarbon radicals having a double bond, such as up to 4, double bonds, being straight, branched, cyclic or polycyclic moieties or combinations thereof and containing from 2 to 18 carbon atoms, such as 2 to 10 carbon atoms, such as from 2 to 8 carbon atoms, such as 2 to 6 carbon atoms, such as 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=CH2, becomes ethenylene, —CH=CH—, when represented as an alkenylene. Other alkenylene groups should be understood accordingly.

The term "alkynyl", as used herein, relates to hydrocarbon radicals having a triple bond, such as up to 4, triple bonds, being straight, branched, cyclic or polycyclic moieties or combinations thereof and having from 2 to 18 carbon atoms, such as 2 to 10 carbon atoms, such as from 2 to 8 carbon atoms, such as from 2 to 6 carbon atoms, such as 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{28}$, $SR^{27}$, $C(O)SR^{27}$, $C(S)NR^{25}R^{28}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{28}$, or aryl, wherein $R^{19}$ to $R^{27}$ each independently represent hydrogen, aryl or lower alkyl, and/or be interrupted by oxygen or sulphur atoms, or by silano or dialkylsilicon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" functional polyester, "a" high Mn polyester, "a" functional compound, "a" functional group X, "a" functional group Y, "a" functional group Z, "a" polyol, "a" polyacid, "a" functional monomer, and the like, one or more of each of these and any other components can be used. As used herein, the term "polymer" refers to oligomers and both homopolymers and copolymers, and the prefix "poly" refers to two or more. Including, for example and like terms means including for example but not limited to. Additionally, although the present invention has been described in terms of "comprising", the processes, materials, and coating compositions detailed herein may also be described as "consisting essentially of" or "consisting of".

The present invention may be according to any of the following aspects:

1. A method for the production of a functional polyester having functional group X, comprising:
   melt blending a composition comprising
   i. a high number average molecular weight (Mn) polyester having a Mn of ≥6,000 Da; and
   ii. a functional compound comprising functional group Y which may be the same as functional group X or be different to functional group X but be operable to form functional group X in the functional polyester,
   wherein the composition is melt blended such that the high Mn polyester and the functional compound react to produce the functional polyester,
   and wherein the high Mn polyester has a Mn that is higher than the Mn of the functional compound.
2. A method according to aspect 1, wherein the high Mn polyester is an organic solvent insoluble polyester, for example the high Mn polyester may have a solubility of less than 0.1 g in 10 mL in tetrahydrofuran at standard ambient temperature and pressure (25° C. and 1 atm).

3. A method according to aspect 1 or 2, wherein the high Mn polyester has a Mn of ≥8,000 Da, such as ≥10,000, or ≥12,000 Da, or ≥15,000 Da.

4. A method according to any preceding aspect, wherein the high Mn polyester has a Mn of ≤500,000 Da, such as ≤200,000, or ≤100,000 Da.

5. A method according to any preceding aspect, wherein the high Mn polyester comprises an ethylenic unsaturation per chain of ≤1, such as of ≤0.5.

6. A method according to any preceding aspect, wherein the high Mn polyester has a gross hydroxyl value (OHV) of ≤15 mg KOH/g, such as ≤10 mg KOH/g, or ≤5 mg KOH/g.

7. A method according to any preceding aspect, wherein the high Mn polyester has an acid value (AV) of ≤15 mg KOH/g, such as ≤10 mg KOH/g, ≤5 mg KOH/g, or ≤2 mg KOH/g.

8. A method according to any preceding aspect, wherein the high Mn polyester has a thiol equivalent weight of ≥1,000 g/equivalent, such as ≥10,000 g/equivalent, or ≥100,000 g/equivalent.

9. A method according to any preceding aspect, wherein the high Mn polyester has an amine equivalent weight of ≥1,000 g/equivalent, such as ≥10,000 g/equivalent, or ≥100,000 g/equivalent.

10. A method according to any preceding aspect, wherein the high Mn polyester has a Tg of from −70° C. to 200° C., 0° C. to 150° C., such as from 50° C. to 120° C.

11. A method according to any preceding aspect, wherein the composition comprises ≥40% of the high Mn polyester by total dry weight of the composition, such as ≥45 wt %, or ≥50 wt %.

12. A method according to any preceding aspect, wherein the composition comprises ≤99.9% of the high Mn polyester by total dry weight of the composition, such as ≤99.5%, or 99%, or ≤98%, or ≤97 wt %, or ≤96 wt %.

13. A method according to any preceding aspect, wherein functional group Y of the functional compound is ethylenic unsaturation, an ether group, an amide group, an amine group, a ketone group, an epoxy group, a hydroxyl group and/or an acid group, such as ethylenic unsaturation, a hydroxyl group and/or a carboxylic acid group, such as ethylenic unsaturation.

14. A method according to any preceding aspect, wherein functional group Y of the functional compound is the same as functional group X of the functional polyester produced by the method of aspects 1 to 13.

15. A method according to any preceding aspect, wherein the functional compound is a polymer, such as a polyester, polyamide, polyether, polyimide, polyacrylic, polyvinyl, polyurethane, polysiloxane, and/or a polyurea.

16. A method according to aspect 15, wherein the Mn of the functional compound is ≤6,000 Da or ≤4,000 Da, such as ≤3,500 Da, or ≤3,000 Da.

17. A method according to aspects 15 or 16, wherein the Mn of the functional compound is ≥500 Da, such as ≥1,000 Da, or ≥1,500 Da.

18. A method according to any one of aspects 15 to 17, wherein the functional compound has an ethylenic unsaturation per chain of ≥0.5, such as ≥1, or ≥1.2, or ≥1.5, or ≥2, or ≥3.

19. A method according to any one of aspects 15 to 18, wherein the functional compound has a gross hydroxyl value (OHV) of ≥20 mg KOH/g, such as ≥40 mg KOH/g, or ≥50 mg KOH/g.

20. A method according to any one of aspects 15 to 19, wherein the functional compound has an acid value (AV) of ≥3 mg KOH/g, such as ≥10 mg KOH/g, or ≥20 mg KOH/g.

21. A method according to any one of aspects 15 to 20, wherein the functional compound has a thiol equivalent weight of ≤2,500 g/equivalent, such as ≤1,000 g/equivalent, or ≤100 g/equivalent.

22. A method according to any one of aspects 15 to 21, wherein the functional compound has an amine equivalent weight of ≤2,500 g/equivalent, such as ≤1,000 g/equivalent, or ≤100 g/equivalent.

23. A method according to any preceding aspect, wherein the Tg or melting point of the functional compound, as appropriate, is from −60° C. to 150° C., or from 20° C. to 100° C., such as from 50 to 70° C.

24. A method according to any preceding aspect, wherein the composition comprises ≥0.1% of the functional compound by total dry weight of the composition, such as ≤0.5%, or ≥1 wt %, such as ≥2 wt %, or ≥3 wt %, or ≥4 wt %.

25. A method according to any preceding aspect, wherein the composition comprises ≤60% of the functional compound by total dry weight of the composition, such as ≤55 wt %, or ≤50 wt %.

26. A method according to any preceding aspect, wherein the mole ratio of functional compound to high Mn polyester in the composition is from 27:1 to 1:142, such as from 7:1 to 1:7, or from 1.25:1 to 12.5.

27. A method according to any preceding aspect, wherein the functional compound is a polyester obtainable by polymerising a polyacid component with a polyol component.

28. A method according to any preceding aspect, wherein the high Mn polyester is obtainable by polymerising a polyacid component with a polyol component.

29. A method according to aspect 27 or 28, wherein polyacid component comprises: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; and/or a monomer having an aliphatic group containing at least 15 carbon atoms; esters and anhydrides of all the aforementioned acids and combinations thereof.

30. A method according to any one of aspects 27 to 29, wherein the polyacid component comprises a diacid selected from phthalic acid; isophthalic acid; terephthalic acid; 1,4 cyclohexane dicarboxylic acid; succinic acid; adipic acid; azelaic add; sebacic acid; fumaric acid; 2,6-naphthalene dicarboxylic acid; orthophthalic acid; phthalic anhydride; tetrahydrophthalic acid; hexahydrophthalic acid; maleic acid; succinic acid; itaconic acid; di-ester materials, such as dimethyl ester derivatives for example dimethyl isophthalate, dimethyl terephthalate, dimethyl 1,4-cyclohexane dicarboxylate, dimethyl 2,6-naphthalene di carboxylate, dimethyl fumarate, dimethyl orthophthalate, dimethylsuccinate, dimethyl glutarate, dimethyl adipate; a monomer having an aliphatic group containing at least 15 carbon atoms; esters and anhydrides of all the aforementioned acids; and mixtures thereof.

31. A method according to any one of aspects 27 to 30, wherein the polyacid component comprises: terephthalic acid (TPA), dimethyl terephthalate, isophthalic acid (IPA), dimethyl isophthalate, 1,4 cyclohexane dicarboxylic acid, hexahydrophthalic anhydride, 2,6-naphthalene dicarboxylic acid, phthalic anhydride, maleic anhydride, fumaric anhydride; and/or a monomer having an aliphatic group containing at least 15 carbon atoms.

32. A method according to any one of aspects 27 to 31, wherein the polyol component comprises: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; 2,2,4,4-tetraalkylcyclobutane-1,3-diol (TACD), such as 2,2,4,4-tetramethylcyclobutane-1,3-diol (TMCD), 2,2,4-trimethyl-1,3-pentanediol (TMPD), caprolactonediol (for example, the reaction product of epsilon-capro lactone and ethylene glycol); hydroxyalkylated bisphenols; polyether glycols, for example, poly(oxytetramethylene)glycol; trimethylol propane; pentaerythritol; di-pentaerythritol; trimethylol ethane; trimethylol butane; dimethylol cyclohexane; bio-derived polyols such as glycerol, sorbitol and isosorbide; and/or a monomer having an aliphatic group containing at least 15 carbon atoms; or combinations thereof.

33. A method according to any one of aspects 27 to 32, wherein the polyol component comprises a diol selected from: ethylene glycol; 1,2-propane diol; 1,3-propane diol; 1,2-butandiol; 1,3-butandiol; 1,4-butandiol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; 2,2,4,4-tetraalkylcyclobutane-1,3-diol (TACD), such as 2,2,4,4-tetramethylcyclobutane-1,3-diol (TMCD), 2,2,4-trimethyl-1,3-pentanediol (TMPD), diethylene glycol; triethylene glycol; dipropylene glycol; tripropylene glycol; 1,4 cyclohexane dimethanol; tricyclodecane dimethanol; isosorbide; 1,4-cyclohexane diol; and/or 1,1'-isopropylidene-bis(4-cyclohexanol); and mixtures thereof.

34. A method according to any one of aspects 27 to 33, wherein the polyol component comprises ethylene glycol (EG), 1,2-propylene glycol (PG), 2-methyl propanediol (2-MPD), neopentyl glycol (NPG), 1,4-cyclohexane dimethanol (CHDM), butyl ethyl propane diol (BEPD), trimethylolpropane (TMP) and/or 1,6 hexanediol.

35. A method according to any of aspects 27 to 34, wherein the polyol and/or the polyacid component of the functional compound comprises a functional monomer, operable to impart functional group Y in the functional compound.

36. A method according to aspect 35, wherein the functional monomer may be selected from: maleic acid, maleic anhydride, fumaric acid, itaconic anhydride, itaconic acid, citraconic anhydride, citraconic acid, aconitic acid, aconitic anhydride, oxalodtraconic acid, oxalocitraconic anhydride, mesaconic acid, mesaconic anhydride, phenyl maleic acid, phenyl maleic anhydride, t-butyl maleic acid, t-butyl maleic anhydride, monomethyl fumarate, monobutyl fumarate, nadic acid, nadic anhydride, methyl maleic acid, methyl maleic anhydride, ricinoleic acid, lesquerolic acid, undecylenic acid, allyl alcohol, 3-buten-1-ol, crotyl alcohol, 4-pentene-1-ol, alpha-angelica lactone, alpha-methytene-γ-butyrolactone, 5,6-dihydro-2H-pyran-2-one, allyl glycidyl ether, and/or trimethylolpropane monoallyl ether.

37. A method according to aspect 35 or 36, wherein the functional monomer comprises an ethylenically unsaturated monomer.

38. A method according to any one of aspects 35 to 37, wherein the functional monomer is a polyacid that is present as a proportion of the dry weight of the polyacid component in an amount of from 5 to 100 wt %, such as from 10 to 50 wt % or from 15 to 30 wt %.

39. A method according to any one of aspects 35 to 38, wherein the functional monomer is a polyol that is present as a proportion of the dry weight of the polyol component in an amount of from 5 to 100 wt %, such as from 10 to 50 wt % or from 15 to 30 wt %.

40. A method according to any one of aspects 35 to 39, wherein the functional monomer is present as a proportion of the dry weight of the combined polyacid and polyol components in an amount of from 1 to 50 wt %, such as from 3 to 30 wt % or from 5 to 20 wt %.

41. A method according to any preceding aspect, wherein the high Mn polyester and/or the functional compound are prepared in the presence of an esterification catalyst, such as a catalyst selected from metal compounds such as stannous octoate; stannous chloride; butyl stannoic acid (hydroxy butyl tin oxide); monobutyl tin tris(2-ethylhexanoate); chloro butyl tin dihydroxide; dibutyl tin oxide; tetra-n-propyl titanate; tetra-n-butyl titanate; zinc acetate; acid compounds such as phosphoric acid; para-toluene sulphonic acid; dodecyl benzene sulphonic acid (DDBSA), tetra alkyl zirconium materials, antimony trioxide, germanium dioxide, bismuth octoate and combinations thereof.

42. A method according to any preceding aspect, wherein the functional compound is a small molecule, such as a small molecule selected from: water, ethylene glycol (EG), diethylene glycol (DEG), 1,2-propylene glycol (PG), 2-methyl propanediol (2-MPD), neopentyl glycol (NPG), 1,4-cyclohexane dimethanol (CHDM), 2,2,4,4-tetramethylcyclobutane-1,3-diol (TMCD), butyl ethyl propane diol (BEPD), trimethylolppropane (TMP), tris (2-hydroxyethyl)isocyanurate (THEIC), 1,6 hexanediol, dihydroxyacetone, dimethylolpropionic acid, allyl alcohol, 3-buten-1-ol, crotyl alcohol, 4-pentene-1-ol, trimethylolpropane monoallyl ether, 1,2-diaminoethane, 1,6-diaminohexane, isophoronediamine, ethanolamine, diethanolamine, melamine, cysteine, cystamine, 2-aminoethanethiol, 2-mercaptoethanol, 1,3- propanedithiol, mercaptosuccinic acid, serine, proline, lysine, aspartic acid, maleic acid, maleic anhydride, fumaric acid, itaconic anhydride, and/or itaconic acid.

43. A method according to any preceding aspect, wherein the functional compound is a small molecule selected from ethylene glycol (EG), diethylene glycol (DEG), 1,2-propylene glycol (PG), 2-methyl propanediol (2-MPD), neopentyl glycol (NPG), 1,4-cyclohexane dimethanol (CHDM), 2,2,4,4-tetramethylcyclobutane-1,3-diol (TMCD), butyl ethyl propane diol (BEPD), 1,6 hexanediol, mercaptosuccinic acid, aspartic acid, maleic acid, maleic anhydride, fumaric acid, itaconic anhydride, and/or itaconic acid 44. A method according to any preceding aspect, wherein the high Mn polyester and the functional compound react during melt blending by transesterification, amidation and/or thioesterification of the functional compound with the high Mn polyester.

45. A method according to any preceding aspect, wherein the functional compound comprises functional group Z operable to react with the high Mn polyester during the melt blending step, such as with a carboxylic acid ester of the high Mn polyester.

46. A method according to aspect 45, wherein functional group Z is an amine group, an epoxy group, a thiol group, an anhydride group, a hydroxy group and/or a carboxy group, such as a hydroxy group and/or a carboxy group, or a hydroxy group.

47. A method according to any preceding aspect, wherein the composition further comprises a catalyst operable to catalyse the reaction between the high Mn polyester and the functional compound, the catalyst may be a transesterification catalyst, an amidation catalyst, or a thioesterification catalyst, for example the catalyst may be a metal catalyst, such as tin, bismuth, zirconium; an acid catalyst, such as phosphoric acid, sulfuric acid, sulfonates; and/or a base catalyst, such as sodium hydroxide, sodium acetate, caesium acetate.

48. A method according to any preceding aspect, wherein the functional polyester produced by the method of any one of aspects 1 to 47 is for use in a coating composition.

49. A method according to any preceding aspect, wherein the functional polyester produced by the method of any one of aspects 1 to 48 is an organic solvent soluble polyester, for example the functional polyester may have a solubility of at least 0.1 g in 10 mL in tetrahydrofuran, or a dibasic ester, for example aromatic 100, at standard ambient temperature and pressure (25° C. and 1 atm), such as ≥1 g in 10 mL, or ≥6 g in 10 mL, or ≥9 g in 10 mL, or ≥12 g in 10 mL.

50. A method according to any preceding aspect, wherein the functional polyester produced by the method of any one of aspects 1 to 49 has a Mn that is higher than the Mn of the functional compound, the functional polyester may have an intermediate Mn that is less than the Mn of the high Mn polyester and greater than the Mn of the functional compound.

51. A method according to any preceding aspect, wherein the Mn of functional polyester produced by the method of any one of aspects 1 to 50 is ≥4,000 Da, or ≥5,000 Da, such as ≥6,000, or ≥7,000 Da.

52. A method according to any preceding aspect, wherein the Mn of functional polyester produced by the method of any one of aspects 1 to 51 is ≤15,000 Da, such as ≤12,000, or ≤10,000 Da.

53. A method according to any preceding aspect, wherein functional group X of the functional polyester produced by the method of any one of aspects 1 to 52 is operable to react with an acrylic polymer such as to graft the acrylic polymer onto the functional polyester via functional group X.

54. A method according to any preceding aspect, wherein functional group X of the functional polyester produced by the method of any one of aspects 1 to 53 is ethylenic unsaturation, an ether group, an amide group, an amine group, a ketone group, a hydroxyl group and/or an acid group, such as ethylenic unsaturation, a hydroxyl group and/or a carboxylic acid group, such as ethylenic unsaturation.

55. A method according to any preceding aspect, wherein the functional polyester produced by the method of any one of aspects 1 to 54 comprises more ethylenically unsaturated groups per chain than the high Mn polyester, a higher AV than the high Mn polyester, a higher OHV than the high Mn polyester, a lower thiol equivalent weight than the high Mn polyester and/or a lower amine equivalent weight than the high Mn polyester.

56. A method according to any preceding aspect, wherein the functional polyester produced by the method of any one of aspects 1 to 55 has an ethylenic unsaturation per chain of ≥0.5, such as ≥1, such as ≥1.1, or ≥1.2, or ≥1.5, such as ethylenic unsaturation per chain.

57. A method according to any preceding aspect, wherein the functional polyester produced by the method of any one of aspects 1 to 56 has a gross hydroxyl value (OHV) of ≥5 mg KOH/g, such as ≥10 mg KOH/g, or ≥15 mg KOH/g.

58. A method according to any preceding aspect, wherein the functional polyester produced by the method of any one of aspects 1 to 57 has an acid value (AV) of ≥1 mg KOH/g, such as ≥3 mg KOH/g, or ≥5 mg KOH/g, such as ≥10 mg KOH/g, or ≥30 mg KOH/g.

59. A method according to any preceding aspect, wherein the functional polyester produced by the method of any one of aspects 1 to 58 has a thiol equivalent weight of ≤100,000 g/equivalent, such as ≤10,000 g/equivalent, or ≤5,000 g/equivalent.

60. A method according to any preceding aspect, wherein the functional polyester produced by the method of any one of aspects 1 to 59 has an amine equivalent weight of ≤100,000 g/equivalent, such as ≤10,000 g/equivalent, or ≤5,000 g/equivalent.

61. A method according to any preceding aspect, wherein the Tg of the functional polyester produced by the method of any one of aspects 1 to 60 is from −60° C. to 200° C., or from −30° C. to 120° C., such as from 20° C. to 100° C., or from 30° C. to 80° C.

62. A method according to any preceding aspect, wherein the high Mn polyester and the functional compound are melt blended in a melt-mixer apparatus or extruder apparatus.

63. A method according to aspect 62, wherein the feed zone temperature of the extruder apparatus is from 20° C. to 350° C., such as from 150° C. to 300° C., or from 220° C. to 260° C.

64. A method according to any preceding aspect, wherein the melt blending temperature is ≥90° C., such as ≥150° C., or ≥200° C., or ≥250° C.

65. A method according to any preceding aspect, wherein the melt blending temperature is from 90° C. to 375° C., such as from 150° C. to 350° C., or from 200° C. to 325° C., or from 250° C. to 300° C.

66. A method according to any of aspects 62 to 65, wherein the residence time is from 0.25 to 20 minutes, such as from 1 to 10 minutes, or from 1.5 to 5 minutes.

67. A method according to any of aspects 62 to 66, wherein the screw or mixing paddle rotation during melt blending of the composition is from 20 to 2,000 µm, such as from 30 to 1,200 rpm, or from 50 to 500 rpm.

68. A functional polyester having functional group X obtainable by a method according to any one of aspects 1 to 67.

69. A method of preparing an acrylic polyester comprising:
grafting an acrylic polymer onto a functional polyester having functional group X to form the acrylic polyester, wherein the functional polyester is obtainable by a method according to any one of aspects 1 to 67.

70. An acrylic polyester obtainable by the method of aspect 69.

71. A method of producing an aqueous dispersion comprising a functional polyester having functional group X and/or an acrylic polyester comprising:
dispersing a functional polyester having functional group X or an acrylic polyester in water, wherein the acrylic polyester is obtainable by the method of aspect 69 and wherein the functional polyester having functional group X is obtainable by the method of any one of aspects 1 to 67.

72. An aqueous dispersion comprising a functional polyester having functional group X and/or an acrylic polyester, wherein the acrylic polyester is obtainable by the method of aspect 69 and wherein the functional polyester having functional group X is obtainable by the method of any one of aspects 1 to 67.

73. A method of producing a solvent solution comprising a functional polyester having functional group X and/or an acrylic polyester comprising:
contacting a functional polyester having functional group X and/or an acrylic polyester with a solvent, wherein the acrylic polyester is obtainable by the method of aspect 69, and wherein the functional polyester having functional group X is obtainable by the method of any one of aspects 1 to 67.

74. A solvent solution comprising a functional polyester having functional group X and/or an acrylic polyester, wherein the acrylic polyester is obtainable by the method of aspect 69 and wherein the functional polyester having functional group X is obtainable by the method of any one of aspects 1 to 67.

75. A method of producing a powder composition comprising a functional polyester having functional group X and/or an acrylic polyester comprising:
removing any solvent from a functional polyester having functional group X and/or an acrylic polyester, wherein the acrylic polyester is obtainable by the method of aspect 69 and wherein the functional polyester having functional group X is obtainable by the method of any one of aspects 1 to 67.

76. A powder composition comprising a functional polyester having functional group X or an acrylic polyester, wherein the acrylic polyester is obtainable by the method of aspect 69 and wherein the functional polyester having functional group X is obtainable by the method of any one of aspects 1 to 67.

77. A method of producing a coating composition comprising:
introducing a crosslinking material to a dispersion, solution or powder composition according to any one of aspects 71 to 76.

78. An aqueous, solventborne or powder coating composition comprising crosslinking material, and further comprising a functional polyester having functional group X and/or an acrylic polyester, wherein the acrylic polyester is obtainable by the method of aspect 69 and wherein the functional polyester having functional group X is obtainable by the method of any one of aspects 1 to 67.

79. An aqueous, solventborne or powder coating composition according to aspect 78, wherein the crosslinking material is selected from phenolic resins (or phenol-formaldehyde resins); aminoplast resins (or triazine-formaldehyde resins); amino resins; epoxy resins; isocyanate resins; beta-hydroxy (alkyl)amide resins; alkylated carbamate resins; polyacids; anhydrides; organometallic acid-functional materials; polyamines; and/or polyamides and combinations thereof.

80. A method of coating at least a portion of a substrate, the method comprising:
a. contacting a coating composition according to any one of aspects 77 to 79 with the substrate;
b. curing the coating composition on the substrate to form a coating.

81. A substrate at least partially coated with a coating composition according to any one of aspects 77 to 79.

82. An article coated at least in part with a coating composition according to any one of aspects 77 to 79, wherein the article is an automotive product, a household or office appliance, furniture item or tool, a powered industrial product, a consumer electronics article, an architectural product or a product protected by an intumescent coating.

83. A package coated at least in part with a coating compositions according to any one of aspects 77 to 79, such as a laminate tube or a metal can.

All of the features contained herein may be combined with any of the above aspects in any combination.

For a better understanding of the invention, and to show how embodiments of the same may be carried into effect, reference will now be made, by way of example, to the following experimental data.

EXAMPLES

Functional compounds in the form of ethylenically unsaturated low Mn polyester examples 1 and 2 were produced as described below using the components shown in Table 1.

Ethylenically unsaturated low Mn polyester examples 1 and 2 were formed as follows. The components of Table 1 were combined and heated to 130° C. with stirring at 400 rpm under 0.5 standard cubic feet per hour (SCFH) $N_2$ blanket. Once the temperature reached 150° C., the temperature was then increased to 190° C. over a 3 hour period with 10° C. steps every 30 min. Once the temperature reached 190° C., a 0.5 SCFH sparge was then started. The AV was then measured every 3-4 hours until an AV of around <2 was obtained.

TABLE 1

Functional compound examples 1 and 2

| Components | Example 1 | Example 2 |
|---|---|---|
| Neopentyl glycol (g) | 1648.10 | — |
| 1,4-Cyclohexanedimethanol (g) | — | 853.3 |
| Isophthalic acid (g) | 1520.00 | — |
| Maleic Anhydride (g) | 479.80 | 435.00 |
| MeHQ (g) | 1.44 | 1.30 |
| Stannous Octoate (g) | 4.7 | — |
| Properties | | |
| AV (mg KOH/g) | 2.10 | 3.77 |
| OH (mg KOH/g) | 46.0 | 141.97 |
| Mn (Da) | 2,327 | 1,360 |
| Mw (Da) | 7,128 | 2,565 |
| Solids % | 99.20 | 95.15 |
| Unsaturation per chain | 3.3 | 4.4 |
| Tg (° C.) | 36 | −5 |

Functional polyester examples 3 to 16 were produced as described below using the components shown in Tables 2 to 4. Each of functional polyesters examples 3 to 16 show the production of a functional polyester having an optimal Mn by melt blending a high Mn polyester with a functional compound. Examples 3 to 11 use one of ethylenically unsaturated low Mn polyester examples 1 and 2, and example 12 to 16 use a functional small molecule.

The polyester materials of examples 3 to 5 and 12 to 16 were formed as follows. Commercial polymer Vylon GK 880 was dried in a hopper drier. The components as shown in Tables 2 to 4 were combined and homogenised with shaking or stirring in a Strand Manufacturing model number S102DS lab grinder. Once homogenised, the batch was fed into a Berstorff ZE25 co-rotating twin screw extruder (25 mm screw diameter, barrel L/D of 45:1) and processed according to the respective conditions shown in Tables 2 to 4.

The polyester materials of examples 6 to 11 were formed as follows. Commercial polymer Vylon GK 880 was dried in a hopper drier. A Brabender Plasti-Corder DR-2051 melt-mixer was also cleaned and pre-heated. The components as shown in Table 3 were combined and homogenised with shaking. Once homogenised, the batch was fed into the melt-mixer and processed according to the respective conditions shown in Table 3. The product was then collected from the mixing cavity and cooled to room temperature in a sample tray or jar.

TABLE 2

Functional polyester examples 3 to 5

| Components | | Ex. 3 | Ex. 4 | Ex. 5 |
|---|---|---|---|---|
| Functional compound (wt %) | | 18.6 | 13.2 | 8.4 |
| Mini-batch (g) | | 50 | 50 | 50 |
| Example 1 (g) | | 9.30 | 6.61 | 4.19 |
| Vylon GK 880[1] (g) | | 40.70 | 43.39 | 45.81 |
| Irganox 1010[2] (g) | | 0.03 | 0.03 | 0.03 |
| Mineral oil[3] (g) | | 0.25 | 0.25 | 0.25 |
| # of mini-batches | | 32 | 32 | 32 |
| total batch mass (g) | | 1600 | 1600 | 1600 |
| Conditions | | | | |
| residence time (m:ss) | | 04:20 | 04:30 | 03:30 |
| torque (ft lb) | | 34.1 | 34.1 | 34.1 |
| screw (RPM) | | 84 | 84 | 84 |
| Temp (° C.) | at feed | 240 | 240 | 240 |
| | at zone 2 | 240 | 240 | 240 |
| | at zone 3 | 260 | 260 | 260 |
| | at zone 4 | 260 | 260 | 260 |
| | at zone 5 | 260 | 260 | 260 |
| | at zone 6 | 260 | 260 | 260 |
| | at die | 260 | 260 | 260 |
| Properties | | | | |
| Mn (Da) | | 4,353 | 4,601 | 5,810 |
| unsaturation per chain | | 2.0 | 1.7 | 1.2 |

[1] available from Tyobo, Mn 15,289 Da, unsaturation per chain of 0, i.e a saturated polyester, Tg 72° C.
[2] available from BASF, radical inhibitor.
[3] available from Sigma Aldrich, processing aid.

TABLE 3

Functional polyester examples 6 to 11

| Components | Ex. 6 | Ex. 7 | Ex. 8 | Ex. 9 | Ex. 10 | Ex. 11 |
|---|---|---|---|---|---|---|
| Functional compound (wt %) | 4.06 | 13.10 | 4.06 | 3.80 | 14.13 | 3.80 |
| Example 2 (g) | 1.78 | 6.35 | 1.78 | 1.66 | 6.93 | 1.66 |
| Vylon (g) | 42.05 | 42.08 | 42.05 | 42.04 | 42.07 | 42.04 |
| Irganox 1010 (g) | 0.03 | 0.03 | 0.03 | 0.03 | 0.03 | 0.03 |
| total (g) | 43.86 | 48.46 | 43.86 | 43.73 | 49.03 | 43.73 |
| Conditions | | | | | | |
| reaction time (m:ss) | 20:00 | 5:00 | 5:00 | 20:00 | 5:00 | 5:00 |
| Paddle RPM | 50 | 50 | 50 | 50 | 50 | 50 |
| Temp (° C.) | 270 | 270 | 270 | 290 | 290 | 290 |
| Properties | | | | | | |
| Mn (Da) | 8,024 | 6,269 | 9,836 | 7,409 | 6,348 | 9,660 |
| unsaturation per chain | 1.8 | 3.3 | 1.8 | 1.7 | 3.4 | 1.7 |

TABLE 4

Functional polyester examples 12 to 16

| Components | Ex. 12 | Ex. 13 | Ex. 14 | Ex. 15 | Ex. 16 |
|---|---|---|---|---|---|
| Functional compound (wt %) | 0.5 | 0.5 | 2 | 2 | 0.5 |
| CHDM (g) | 2.5 | 2.5 | 10.00 | 10.00 | — |
| TMCD[1] (g) | — | — | — | — | 1.25 |
| Vylon (g) | 497.50 | 497.49 | 490.00 | 489.99 | 248.72 |
| DBTO[2] (g) | — | 0.01 | — | 0.01 | 0.025 |
| total (g) | 500.00 | 500.00 | 500.00 | 500.00 | 250.00 |
| Conditions | | | | | |
| residence time (m:ss) | 3:02 | 3:02 | 3:02 | 3:02 | 3:02 |
| torque (ft lb) | 40.6 | 40.6 | 40.6 | 40.6 | 40.6 |
| screw (RPM) | 100 | 100 | 100 | 100 | 100 |

TABLE 4-continued

Functional polyester examples 12 to 16

| Components | | Ex. 12 | Ex. 13 | Ex. 14 | Ex. 15 | Ex. 16 |
|---|---|---|---|---|---|---|
| Temp (° C.) | at feed | 240 | 240 | 240 | 240 | 240 |
| | at zone 2 | 240 | 240 | 240 | 240 | 240 |
| | at zone 3 | 260 | 260 | 260 | 260 | 260 |
| | at zone 4 | 260 | 260 | 260 | 260 | 260 |
| | at zone 5 | 260 | 260 | 260 | 260 | 260 |
| | at zone 6 | 260 | 260 | 260 | 260 | 260 |
| | at die | 260 | 260 | 260 | 260 | 260 |
| Properties | | | | | | |
| Tg (° C.) | | 75 | 78 | 68 | 71 | 78 |
| Mn (Da) | | 4,734 | 5,271 | 4,379 | 4,506 | 6,358 |
| Mw (Da) | | 15,023 | 18,131 | 14,831 | 15,053 | 25,934 |
| AV (mg KOH/g) | | 7.41 | 5.90 | 4.84 | 4.44 | 4.62 |
| OHV (mg KOH/g) | | 14.81 | 14.10 | 24.34 | 25.54 | 12.82 |

[1]purchased from Sigma Aldrich.
[2]available from Arkema Inc., transesterification catalyst.

As shown by the results of Tables 2 to 4, the above-mentioned method provides a quick and reliable route to the production of functionalised polyesters having an optimal Mn for application in a coating composition to provide the desired mechanical properties.

Aqueous dispersions were synthesized from functionalised polyester examples 5 and 10 using the conditions described below and the components of Tables 5 to 7.

The polyester materials of examples 5 and 10 were thinned using Dowanol DPM according to Table 5. The chipped polyester and Dowanol DPM were added to a vessel with mixing at 320 rpm and heated to 130° C. The batch was held at 130° C. until the mixture appeared to be homogenous, and then held for an additional hour at 130° C.

The thinned polyester materials of examples 17 and 18 were then used to synthesize solventborne polyester-graft-acrylic resins as detailed in Table 6. PGA example 19 was synthesized using a single polyester addition and a single acrylic monomer feed, while PGA example 20 was synthesized using two split polyester charges and two split acrylic monomer feeds.

For the synthesis of PGA example 19, the thinned polyester example 17 was added with the first charge of Dowanol DPM to a vessel with 350 rpm stirring and heated to 120° C. Once at 120° C., the mixture of acrylic monomer detailed in Table 6 was added over 40 minutes. 10 minutes after the start of the acrylic monomer feed, approximately 72.8% of a mixture of the t-butyl peroctoate initiator and second Dowanol DPM charge was fed over 30 minutes. Upon the completion of both feeds, the mixture was held at 120° C. with continued stirring for 10 minutes. Approximately 13.6% of the mixture of the t-butyl peroctoate initiator and second Dowanol DPM charge was then fed in over 5 minutes followed by an additional hold for 30 minutes at 120° C. with continued stirring. The remaining mixture of the t-butyl peroctoate initiator and second Dowanol DPM charge was then fed in over 5 minutes followed by an additional hold for 30 minutes at 120° C. with continued stirring. The mixture was then allowed to cool to less than 95° C. before being poured out.

For the synthesis of PGA example 20, half the amount of thinned polyester example 18 given in Table 6 was added with the full first charge of Dowanol DPM to a vessel with 350 rpm stirring and heated to 120° C. Once at 120° C., half the mixture of acrylic monomer detailed in Table 6 was added over 80 minutes. 20 minutes after the start of the acrylic monomer feed, approximately 36.4% of a mixture of the t-butyl peroctoate initiator and second Dowanol DPM charge was fed over 60 minutes. Upon the completion of both feeds, the remaining portion of thinned polyester example 18 was added to the vessel. The reaction mixture was then reheated to 120° C. and the stirring was increased to 400 rpm. 20 minutes after the start of the acrylic monomer feed, approximately 36.4% of a mixture of the t-butyl peroctoate initiator and second Dowanol DPM charge was fed over 60 minutes. Then the remaining mixture of acrylic monomers was added over 80 minutes. The stirring was then increased to 425 rpm, and approximately 13.6% of the mixture of t-butyl peroctoate initiator and second Dowanol DPM charge was then fed in over 10 minutes followed by an additional hold for 30 minutes at 120° C. The remaining mixture of t-butyl peroctoate initiator and second Dowanol DPM charge was then fed in over 10 minutes followed by an additional hold for 30 minutes at 120° C. with continued stirring. The mixture was then allowed to cool to less than 95° C. before being poured out.

The acrylic modified polyester resins were then formed into aqueous dispersions as detailed in Table 7.

The PGA resin was added to a vessel with mixing at 400 rpm and heated to 90° C. Then dimethylethanolamine was fed into the mixture over 10 minutes. Deionized water was then fed into the mixture over 60 minutes while attempting to keep the mixture temperature at 90° C. The aqueous dispersions were allowed to cool to less 45° C. before being poured out.

TABLE 5

Thinned polyester examples 17 and 18

| Components | Example 17 | Example 18 |
|---|---|---|
| Polyester Example 10 (g) | 20.00 | — |
| Polyester Example 5 (g) | — | 455.00 |
| Dowanol DPM (g) | 5.32 | 245.00 |

TABLE 6

Solventborne polyester-graft-acrylic examples 19 and 20

| Components | Example 19 | Example 20 |
|---|---|---|
| Thinned polyester example 17 (g) | 10.72 | — |
| Thinned polyester example 18 (g) | — | 571.03 |
| Dowanol DPM, charge 1 (g) | 2.81 | 80.14 |
| Methacrylic Acid (g) | 1.27 | 43.97 |

TABLE 6-continued

Solventborne polyester-graft-acrylic examples 19 and 20

| Components | Example 19 | Example 20 |
|---|---|---|
| Methyl Methacrylate (g) | 1.16 | 40.30 |
| Ethyl Methacrylate (g) | 1.16 | 40.30 |
| Hydroxyethyl methacrylate (g) | 0.64 | 21.98 |
| Dowanol DPM, charge 2 (g) | 5.01 | 89.00 |
| t-Butyl peroctoate (g) | 0.38 | 13.28 |
| Total (g) | 26.00 | 900.00 |
| Properties | | |
| AV (mg KOH/g) | 36.6 | 35.00 |
| Mn (Da) | 4656 | 4687 |
| Mw (Da) | 135540 | 21457 |
| Solids % | 58.90 | 57.74 |

TABLE 7

Aqueous dispersion examples 21 and 22

| Components | Example 21 | Example 22 |
|---|---|---|
| PGA example 19 (g) | 22.20 | |
| PGA example 20 (g) | | 300.00 |
| Dimethylethanolamine (g) | 0.74 | 10.85 |
| Deionized water (g) | 31.64 | 439.15 |
| Total (g) | 54.58 | 750.00 |
| Properties | | |
| Solids % | 25.95 | 25.15 |
| Brookfield viscosity, #04 spindle, 60 rpm, 23° C. (cP) | 54.0 | 80.0 |
| Average particle size (um)[1] | 0.785 | 0.138 |

[1]As measured using a Malvern Mastersizer Hydro 2000S particle size analyser

The aqueous PGA dispersions from examples 21 and 22 were formed into aqueous coating compositions with components as shown in Table 8, as follows. The deionized water, Dowanol PηB, crosslinking material and blocked DDBSA catalyst were stirred into the aqueous dispersion to form the aqueous coating composition.

TABLE 8

Coating Compositions Examples 23 and 24

| Components | Example 23 | Example 24 |
|---|---|---|
| Aqueous PGA Dispersion Example 21 (g) | | 40 |
| Aqueous PGA Dispersion Example 22 (g) | 40 | |
| Deionized water (g) | 5.87 | 4.43 |
| Dowanol PnB (g) | 1.15 | 1.12 |
| Cymel 1123 (g) | 1.15 | 1.12 |
| NaCure 5925 (g) | 0.04 | 0.04 |
| Properties | | |
| Total (g) | 48.21 | 46.71 |
| % Crosslinker | 10.0 | 10.0 |
| % Catalyst | 0.1 | 0.1 |
| % Final solids | 24.0 | 24.0 |

Coated panels were obtained by drawing the aqueous coatings over a zirconium pre-treated 5182-H48 aluminium panels using a wire wound rod to obtain dry coating weights of approximately 7.0 mg/square inch (msi). The coated panels were immediately placed into a one-zone, gas-fired, conveyor oven for 10 seconds and baked to a peak metal temperature of 450° F. (232° C.).

The coatings were screened for performance in a series of soak tests as shown in Table 9.

Adhesion testing was performed to assess whether the coating adheres to the substrate. The adhesion test was performed according to ASTM D 3359 Test Method B, using Scotch 610 tape, available from 3M Company of Saint Paul, Minn. Adhesion was rated on a scale of 0-5 where a rating of "5" indicates no adhesion failure.

The coatings were inspected for blistering after each soak test. Blistering is a film defect phenomena caused by the interpolation of liquid or gas between the coating and substrate surface. Blistering is indicative of poor film barrier properties and/or poor film adhesion to the substrate. To pass a given soak test, coatings must be qualitatively blister free.

The "Dowfax" test is designed to measure the resistance of a coating to a boiling detergent solution. The solution was prepared by mixing 5 grams of DOWFAX 2A1 (product of Dow Chemical) into 3000 grams of deionized water. Coated strips were immersed into the boiling Dowfax solution for 15 minutes. The strips were then rinsed and cooled in deionized water, dried, and immediately rated for blistering and adhesion as described previously.

The "DI Water Retort" test is designed to measure the resistance of a coating to deionized water. Coated strips were immersed into the deionized water and placed in a steam retort for 30 minutes at 250° F. (121° C.). The strips were then cooled in deionized water, dried, and immediately rated for blistering and adhesion as described previously.

TABLE 9

Coating Properties of Examples 22 and 23

| | Dowfax | | DI water retort | |
|---|---|---|---|---|
| Coating | Adhesion | Blistering | Adhesion | Blistering |
| Example 23 | 3 | Pass | 5 | Pass |
| Example 24 | 4 | Pass | 5 | Pass |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for the production of a functional polyester having functional group X, comprising:
   melt blending a composition comprising
   i. a high number average molecular weight (Mn) polyester having a Mn of ≥6,000 Da; and
   ii. a functional compound reactive with component (i) and having an Mn of 500 to 6,000 Da,
   wherein the composition is melt blended such that the high Mn polyester and the functional compound react to produce the functional polyester,
   and
   wherein the functional polyester has an Mn that is less than the Mn of the high Mn polyester and greater than the Mn of the functional compound.

2. A method according to claim 1, wherein the high Mn polyester is an organic solvent insoluble polyester.

3. A method according to claim 1, wherein the high Mn polyester has a Mn of ≥8,000 Da.

4. A method according to claim 1, wherein the melt blending temperature is ≥90° C.

5. The method according to claim 1, wherein the functional compound comprises ethylenic unsaturation.

6. The method according to claim 1, wherein X comprises ethylenic unsaturation, an ether group, an amide group, an amine group, a ketone group, a hydroxyl group and/or an acid group.

7. The method according to claim 1, wherein the composition is melt blended for a residence time of 0.25 to 20 minutes.

8. The method according to claim 1, wherein the composition is melt blended for a residence time of one to ten minutes.

9. The method according to claim 1, wherein the composition is melt blended for a residence time of 1.5 to five minutes.

10. The method according to claim 1, wherein the composition is melt blended for about three minutes.

11. A functional polyester having functional group X obtained by a method according to claim 7, wherein functional group X can crosslink to form a cured film and wherein the reaction product of the method contains fewer by-products when compared to the reaction product of a batch process having the same residence time.

12. An aqueous dispersion comprising the functional polyester of claim 11.

13. A solvent solution comprising the functional polyester of claim 11.

14. A powder composition comprising the functional polyester of claim 11.

15. The functionalized polyester of claim 11, having an Mn of greater than 4,000.

16. The functionalized polyester of claim 11, having an Mw of greater than 15,000.

17. The functionalized polyester of claim 11, having a polydispersity index of greater than 3.

18. A method of using the functional polyester obtained by a method according to claim 7 to prepare an acrylic polyester comprising:
   polymerizing acrylic monomers in the presence of the functional polyester.

19. An acrylic polyester obtained by the method of claim 18, wherein the acrylic polyester can crosslink to form a cured film.

20. An aqueous, solvent-borne, or powder coating composition comprising a crosslinking material and the acrylic polyester of claim 19.

21. An aqueous, solvent-borne or powder coating composition comprising crosslinking material, and further comprising the functional polyester of claim 18.

22. A substrate at least partially coated with a coating composition according to claim 21.

23. An article coated at least in part with a coating composition according to claim 21, wherein the article is an automotive product, a household or office appliance, furniture item or tool, a powered industrial product, a consumer electronics article, an architectural product or a product protected by an intumescent coating.

24. A package coated at least in part with a coating composition according to claim 21.

* * * * *